(12) United States Patent
Matsuki

(10) Patent No.: US 10,289,521 B2
(45) Date of Patent: May 14, 2019

(54) ANALYSIS DEVICE FOR ANALYZING PERFORMANCE INFORMATION OF AN APPLICATION AND A VIRTUAL MACHINE

(71) Applicant: FUJITSU LIMITED, Kawasaki-shi, Kanagawa (JP)

(72) Inventor: Tatsuma Matsuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 54 days.

(21) Appl. No.: 15/418,802

(22) Filed: Jan. 30, 2017

(65) Prior Publication Data

US 2017/0235659 A1    Aug. 17, 2017

(30) Foreign Application Priority Data

Feb. 16, 2016    (JP) ................................. 2016-027139

(51) Int. Cl.
*G06F 11/00* (2006.01)
*G06F 11/34* (2006.01)
(Continued)

(52) U.S. Cl.
CPC ...... *G06F 11/3452* (2013.01); *G06F 11/1484* (2013.01); *G06F 11/301* (2013.01);
(Continued)

(58) Field of Classification Search
CPC ............. G06F 11/3452; G06F 11/1484; G06F 11/3006; G06F 11/301; G06F 11/3409;
(Continued)

(56) References Cited

U.S. PATENT DOCUMENTS 6,175,424 B1    1/2001   Iino et al.
2008/0306711 A1*  12/2008   Bansal ................ G06F 11/3419
                                                    702/182
(Continued)

FOREIGN PATENT DOCUMENTS

JP    10-233923     9/1998
JP    2006-318263   11/2006
(Continued)

OTHER PUBLICATIONS

Pang-Ning Tan et al., Introduction to Data Mining, 1st Edition, Pearson, May 12, 2005, Chapter 6: Association Analysis: Basic Concepts and Algorithms; pp. 327-414 (Year: 2005).*

*Primary Examiner* — Joseph D Manoskey
(74) *Attorney, Agent, or Firm* — Fujitsu Patent Center

(57) ABSTRACT

An analysis device analyzes performance information of an application and performance information of a virtual machine. The analysis device includes a memory and processor. The processor converts a value, of every hour, of performance information of the application into binary data on the basis of a first threshold and converts a value, of every hour, of performance information of the virtual machine into binary data as a second threshold. The processor calculates a reliability and a supportability on the basis of performance information of an application converted into binary data and performance information converted into binary data for each of the second thresholds. The processor extracts a type, which is performance information of a virtual machine that is a cause of a process delay of a type of an application as the analysis target, on the basis of the reliability and the supportability.

9 Claims, 24 Drawing Sheets

CLOUD INFRASTRUCTURE SYSTEM

(51) Int. Cl.
*G06F 11/14* (2006.01)
*G06F 11/30* (2006.01)

(52) U.S. Cl.
CPC ...... *G06F 11/3006* (2013.01); *G06F 11/3409* (2013.01); *G06F 11/3419* (2013.01); *G06F 11/008* (2013.01); *G06F 2201/815* (2013.01); *G06F 2201/865* (2013.01)

(58) Field of Classification Search
CPC .............. G06F 11/3419; G06F 11/008; G06F 2201/815; G06F 2201/865
See application file for complete search history.

(56) References Cited

U.S. PATENT DOCUMENTS

| | | | | |
|---|---|---|---|---|
| 2009/0265707 | A1* | 10/2009 | Goodman | G06F 9/5016 718/1 |
| 2010/0131506 | A1* | 5/2010 | Shintani | G06K 9/6218 707/737 |
| 2010/0268816 | A1* | 10/2010 | Tarui | H04L 12/00 709/224 |
| 2015/0067143 | A1* | 3/2015 | Babakhan | G06F 11/301 709/224 |
| 2015/0381409 | A1* | 12/2015 | Margalit | H04L 41/0631 709/221 |

FOREIGN PATENT DOCUMENTS

| | | |
|---|---|---|
| JP | 2012-38066 | 2/2012 |
| JP | 2014-238852 | 12/2014 |
| JP | 2015-152984 | 8/2015 |

\* cited by examiner

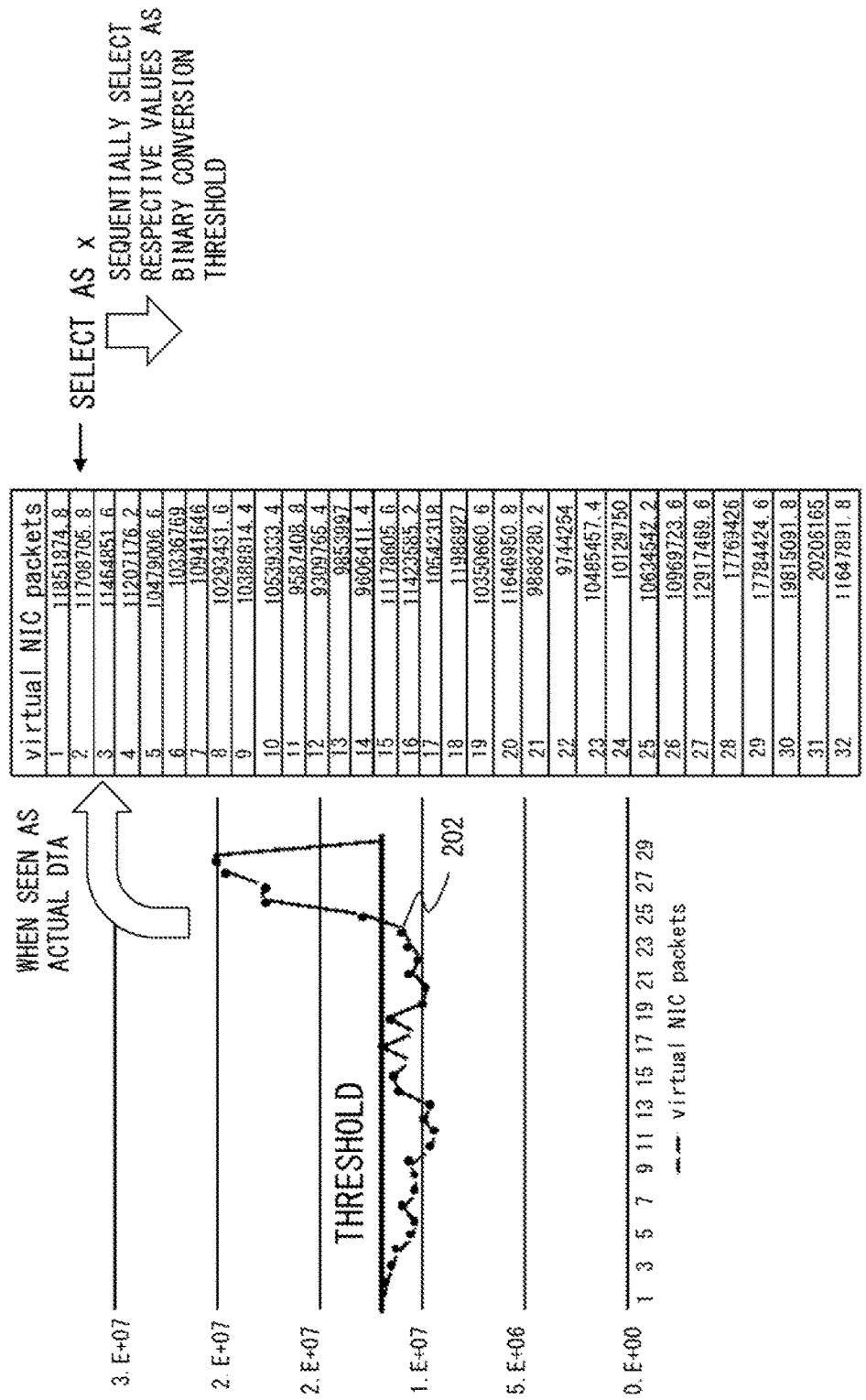
F I G. 6A

APPLICATION PERFORMANCE INFORMATION TABLE

5001

| TIME OF DAY | VALUE (RESPONSE TIME ETC.) |
|---|---|
| 2015/6/8 10:23:55 | 5 |
| 2015/6/8 10:24:10 | 6 |
| 2015/6/8 10:24:25 | 4 |
| ... | ... |
| 2015/6/8 18:50:12 | 5 |
| 2015/6/8 18:50:33 | 5 |
| 2015/6/8 18:50:55 | 4 |

VM PERFORMANCE INFORMATION TABLE

5002

| VM NAME | PERFORMANCE INFORMATION NAME | TIME OF DAY | VALUE |
|---|---|---|---|
| VM1 | CPU USE RATE | 2015/6/8 10:23:00 | 50 |
| VM1 | CPU USE RATE | 2015/6/8 10:24:00 | 35 |
| VM1 | CPU USE RATE | 2015/6/8 10:25:00 | 42 |
| ... | ... | ... | ... |
| VM1 | CPU USE RATE | 2015/6/8 18:49:00 | 51 |
| VM1 | CPU USE RATE | 2015/6/8 18:50:00 | 57 |
| VM1 | CPU USE RATE | 2015/6/8 18:51:00 | 49 |

DATA PAIR INFORMATION

| TIME UNIT | APPLICATION PERFORMANCE INFORMATION | VM PERFORMANCE INFORMATION |
|---|---|---|
| $t_1$ | 4.1 | 4.9 |
| $t_2$ | 3.2 | 5.4 |
| $t_3$ | 2.4 | 4.5 |
| ... | ... | ... |
| $t_{12}$ | 2.0 | 3.1 |

FIG. 10B

CORRELATION COEFFICIENT
CALCULATION RESULT

6200

| VM NAME | PERFORMANCE INFORMATION NAME | CORRELATION COEFFICIENT |
|---|---|---|
| VM1 | CPU USE RATE | 0.35 |
| VM1 | DISK IOPS | 0.88 |
| VM2 | NUMBER OF PACKETS | 0.21 |
| ... | ... | ... |
| VM2 | DISK IOPS | 0.48 |

FIG. 11

CORRELATION DETERMINATION INFORMATION TABLE

6300

| TYPE | VALUE |
|---|---|
| CORRELATION DETERMINATION THRESHOLD | 0.577 |
| NO-CORRELATION DETERMINATION THRESHOLD | 0.358 |

VM PERFORMANCE INFORMATION WITH RELIABILITY
EQUAL TO OR GREATER THAN 0.8 AND
SUPPORTABILITY EQUAL TO OR GREATER THAN 0.2

| VM NAME | PERFORMANCE INFORMATION NAME | RELIABILITY | SUPPORTABILITY |
|---------|------------------------------|-------------|----------------|
| VM1 |  | 1 | 0.45 |
| VM1 |  | 0.88 | 0.68 |
| ... | ... | ... | ... |
| VM2 |  | 0.97 | 0.32 |

6200a

VM PERFORMANCE INFORMATION EQUAL
TO OR GREATER THAN CORRELATION
DETERMINATION THRESHOLD

| VM NAME | PERFORMANCE INFORMATION NAME | CORRELATION COEFFICIENT |
|---------|------------------------------|--------------------------|
| VM1 | ... | 0.88 |
| VM1 | ... | ... |

| CAUSE-CANDIDATE VM | SUM OF CORRELATION COEFFICIENTS |
|---|---|
| centos7-11 | 9.765835 |
| windows7-10 | 2.182374 |
| centos7-10 | 9.754696 |
| windows7-1 | 1.774437 |
| centos7-12 | 2.999546 |
| windows7-11 | 1.332106 |
| centos7-9 | 3.515154 |
| windows7-14 | 1.776818 |
| windows7-13 | 1.751117 |
| windows7-17 | 1.777633 |
| windows7-16 | 1.743216 |

| CAUSE-CANDIDATE VM | PRIORITY |
|---|---|
| centos7-10 | HIGH |
| centos7-11 | HIGH |
| Server87 | INTERMEDIATE |
| centos7-12 | INTERMEDIATE |
| centos7-9 | INTERMEDIATE |
| windows7-11 | LOW |
| windows7-18 | LOW |
| windows7-16 | LOW |
| windows7-13 | LOW |
| windows7-1 | LOW |
| windows7-15 | LOW |

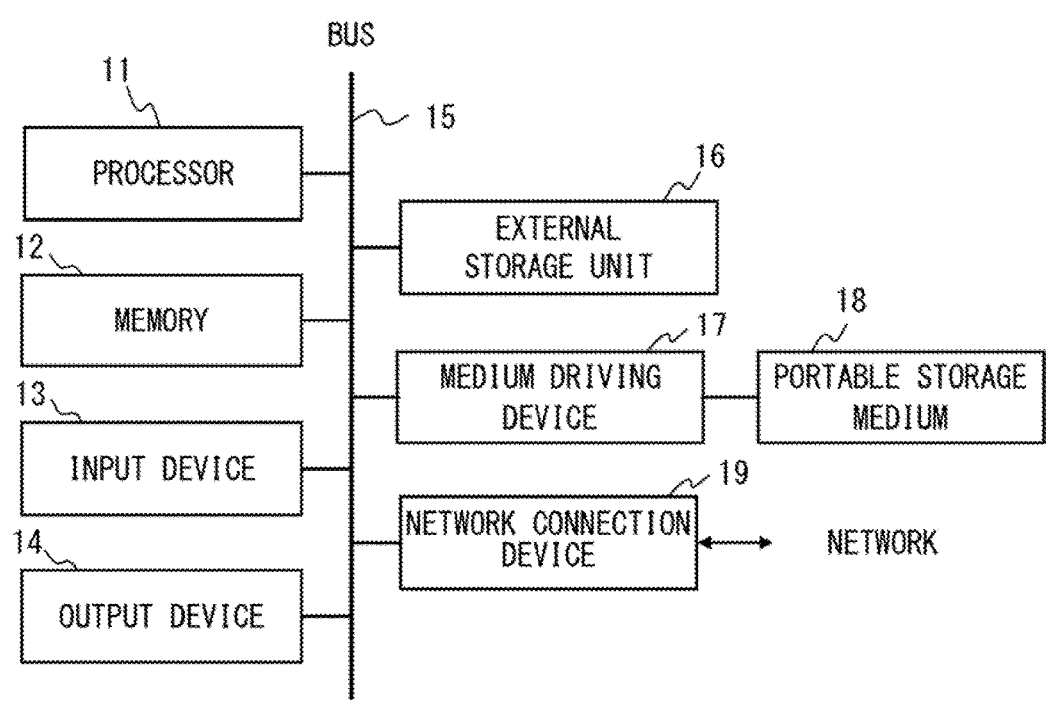
F I G. 1 8

ANALYSIS DEVICE FOR ANALYZING PERFORMANCE INFORMATION OF AN APPLICATION AND A VIRTUAL MACHINE

CROSS-REFERENCE TO RELATED APPLICATION

This application is based upon and claims the benefit of priority of the prior Japanese Patent Application No. 2016-027139, filed on Feb. 16, 2016, the entire contents of which are incorporated herein by reference.

FIELD

The embodiments discussed herein are related to performance monitoring of servers.

BACKGROUND

Cloud serves, which emerged accompanying the development of the virtualization technology, are now used over a very wide variety of fields. Meanwhile, virtualization infrastructure systems for providing cloud services are becoming larger and more complicated in recent years, making it difficult to respond to problems such as system abnormalities and disorders.

FIG. 1 illustrates an example of a cloud infrastructure system and an analysis device. A cloud infrastructure system 1000 includes a plurality of shared switches 1100 and a plurality of shared servers 1200. The plurality of shared servers 1200 can communicate to each other via the shared switches 1100. The plurality of shared servers 1200 share computer resources so as to implement one cloud infrastructure system.

Specifically, the plurality of shared servers 1200 cooperate so as to operate a host Operation System (OS) 2001. The host OS 2001 is software, for managing the entire system, that implements a function for fundamental management and control of the plurality of shared servers and a fundamental function that is used by the pieces of installed software. Note that the plurality of shared servers 1200 may operate the plurality of host OSs 2001.

On the host OS 2001, a hypervisor 2002 operates. The hypervisor 2002 is a control program for implementing a virtual machine (VM), which is a virtualization technique for computers. On the hypervisor 2002, a plurality of virtual machines 2003 (virtual machines 2003a through 2003c for example) operate.

As a service according to a cloud infrastructure system, each of the virtual machines 2003a through 2003c is provided to the user. The user can operate one of the virtual machines 2004a through 2004c on the virtual machines 2003 that he or she can use.

In the cloud infrastructure system 1000 as described above, the user can obtain application performance information of the virtual machines 2003 that he or she can use. Application performance information is time-series data that represents the performance of an application operating on the cloud. Application performance information is time-series data such as for example a response time and throughput for a web access, a response time and throughput for a database query, a process time and throughput for a data process, etc.

The system performance information of the cloud infrastructure system 1000 is transmitted to an analysis device 3000. System performance information is time-series data representing the system performance and the load condition that can be obtained from the cloud infrastructure system. Examples of the system performance information include the CPU (Central Processing unit) use rate and the virtual CPU use rate of the server, network throughput, virtual Network Interface Card (NIC) throughput, etc. The administrator uses the performance information collected in the analysis device 3000 so as to manage the performance of the cloud infrastructure system 1000. Note that the user can obtain part of the system performance information of the virtual machines 2003 that he or she can use.

When a problem occurs in the system, the administrator analyzes log information, statistical information, configuration information, system performance information, etc. collected in the analysis device 3000 so as to presume the cause of the problem and make a recovery promptly. In a cloud infrastructure system, it is difficult to perform manual analysis for all information including log information, statistical information, configuration information, system performance information, etc. Causes of problems of virtualization systems particularly may be generated on a wide range of layers (layers of the applications 2004, the virtual machines 2003, the hypervisor 2002, the host OS 2001, the shared servers 1200, the shared switches 1100, etc.). At the same time, a different administrator often manages each layer, which makes it difficult to respond to problems.

In the cloud infrastructure system 1000 illustrated in FIG. 1, the layer of the applications 2004 is managed by the user. Meanwhile, the layers of the virtual machines 2003, the hypervisor 2002, the host OS 2001, the shared servers 1200, the shared switches 1100, etc. are managed by the administrator.

When performance deterioration such as a slowdown in the processing speed of the application has occurred in the application 2004 used by a user, the administrator receives a report of the performance deterioration from the user. In the cloud infrastructure system, the computer resources of the shared servers 1200 are used by a different virtual machine in competition with the application. Accordingly, the administrator analyzes for example log information, statistical information, configuration information, system performance information, etc. collected in the analysis device 3000 so as to presume a virtual machine that is a cause of the performance deterioration.

In order to presume a virtual machine, the administrator first receives the application performance information of the application from the user. The administrator estimates the performance information of a virtual machine having a correlation with the application performance information by using the analysis device 3000. This makes it possible to presume a virtual machine that is a cause of the performance deterioration of the application used by the user.

When the correlative relationship between the performance information of a virtual machine and the application performance information is effective only during a temporary period of time, the analysis device 3000 fails to presume a virtual machine causing the performance deterioration in some cases. Thus, when the correlative relationship between the performance information of a virtual machine and the application performance information is effective only during a temporary period of time, the presumption performance, which represents the degree to which a virtual machine causing performance deterioration can be presumed, deteriorates.

A system that detects performance deterioration in a system for providing information communication services is known. The system generates a correlation function representing a correlation coefficient between different types of performance information, provides the obtained performance information to the correlation function so as to analysis whether or not the correlative relationship is maintained, and thereby detects performance deterioration (see Patent Document 1 for example).

A technique of using a correlation rule for extracting a column in a correspondence relationship between two pieces of data is known (see Patent Document 2 for example).

An analysis system that simply and securely identifies an explanatory variable influencing an objective variable is known regarding an objective variable related to the quality of settled objects and an explanatory variable related to the production of settled objects.

A device that uses resource information of a virtual machine is known. A virtual machine arrangement device determines the predictability of a resource use amount, and simultaneously levels the time-series pattern of the predicted resource use amount and any types of resource use amounts for a predictable virtual machine (see Patent Document 4, for example).

A method is known in which a fundamental image represented by multiple-valued data is binarized by applying a circulation error diffusion method so as to reduce generated noise by utilizing the binarization of the fundamental image.

Patent document 1: Japanese Laid-open Patent Publication No. 2014-238852
Patent document 2: Japanese Laid-open Patent Publication No. 2012-38066
Patent document 3: Japanese Laid-open Patent Publication No. 2006-318263
Patent document 4: Japanese Laid-open Patent Publication No. 2015-152984
Patent document 5: Japanese Laid-open Patent Publication No. 10-233923

SUMMARY

According to an aspect of the present invention, an analysis device analyzes performance information of an application and performance information of a virtual machine. The analysis device includes a memory and a processor. The processor converts a value, of every hour, of performance information of the application into binary data on the basis of a first threshold and converts a value, of every hour, of performance information of the virtual machine into binary data as a second threshold. The processor calculates a reliability and a supportability on the basis of performance information of an application converted into binary data and performance information converted into binary data for each of the second thresholds. The processor extracts a type, which is performance information of a virtual machine that is a cause of a process delay of a type of an application as the analysis target, on the basis of the reliability and the supportability.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6A explains an example of a binary conversion process of VM performance information;

FIG. 9 illustrates examples of an application performance information table and a VM performance information table;

FIG. 10B illustrates an example of a process of a correlation coefficient calculation unit;

FIG. 11 illustrates an example of a calculation result of correlation coefficients;

FIG. 12 illustrates an example of a correlation determination information table;

FIG. 16A illustrates an example of an extraction process of an extraction unit;

FIG. 18 illustrates an example of a hardware configuration of an analysis device;

DESCRIPTION OF EMBODIMENTS

A plurality of virtual machines provided by a cloud infrastructure system share the computer resources of the cloud service infrastructure. Occurrence of competition for computer resources between virtual machines may cause delay (performance deterioration) of an application operating on the virtual machines. When performance deterioration as described above occurs, the administrator receives application performance information such as for example the response time, the throughput, etc from the user. The administrator registers the received application performance information in the analysis device 3000. The analysis device 3000 extracts a correlative relationship between the application performance information and the performance information of the virtual machine such as the virtual CPU use rate, the virtual NIC throughput, etc. so as to presume a virtual machine that caused the resource competition. Hereinafter, the performance information of a virtual machine will be referred to as VM performance information.

However, evaluating a correlative relationship between VM performance information and the application performance information by using a correlation coefficient when the correlative relationship between the VM performance information and the application performance information is effective only during a temporary period of time sometimes prevents the presumption of a virtual machine that caused performance deterioration.

As a general rule, when comparison indicates a correlative relationship in pieces of time-series data between the performance information of a system and the performance information of a function (application), the function (application) can be identified as the cause of the abnormality. When a temporary correlation is detected, it sometimes is not recognized as the cause of an abnormally. Because not all abnormalities have continuous correlations, it sometimes is not possible to recognize the abnormality of a function (application). This reduces the recall rate.

Figure 1:
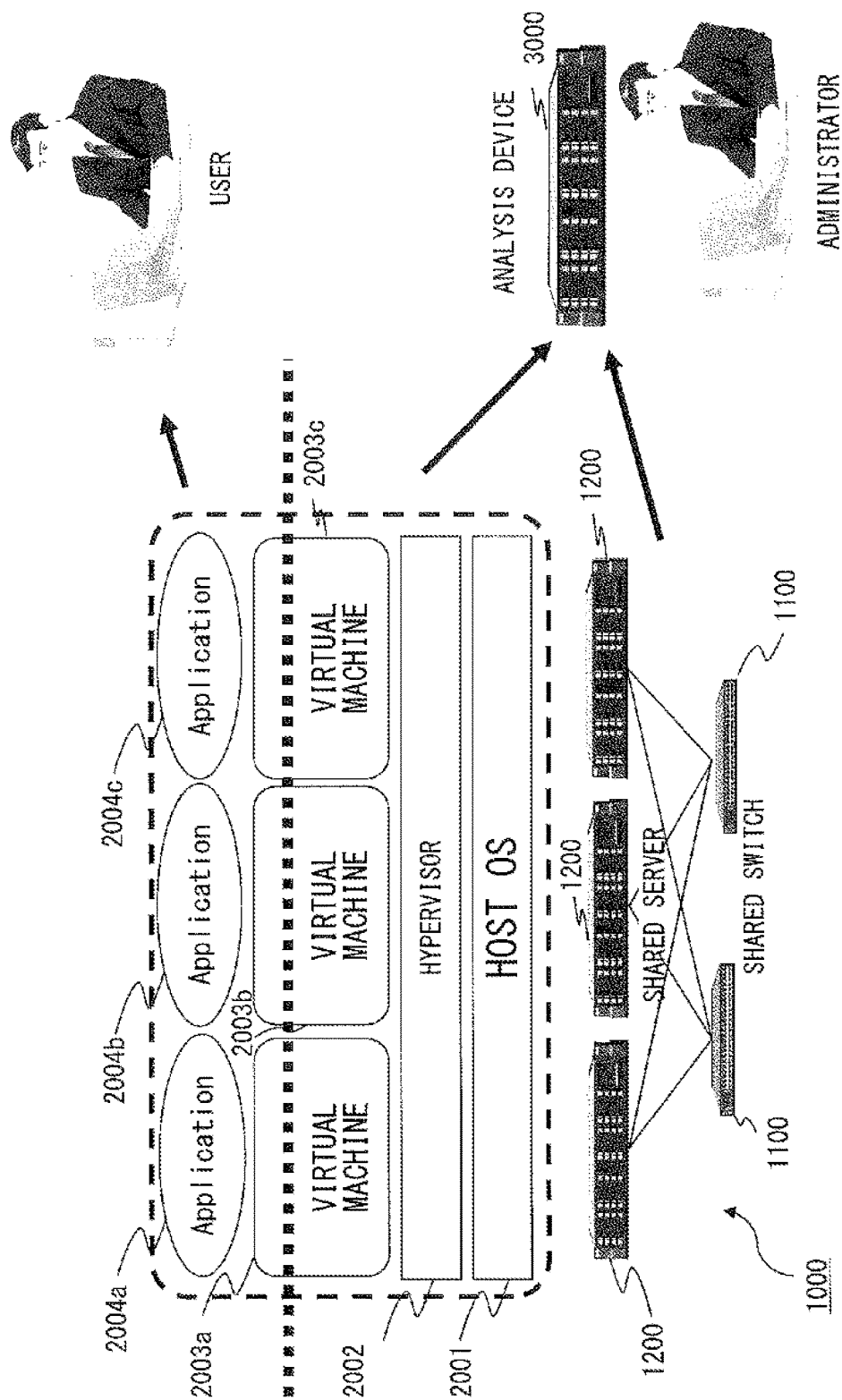
FIG. 1 illustrates an example of a cloud infrastructure system and an analysis device.
Figure 2:
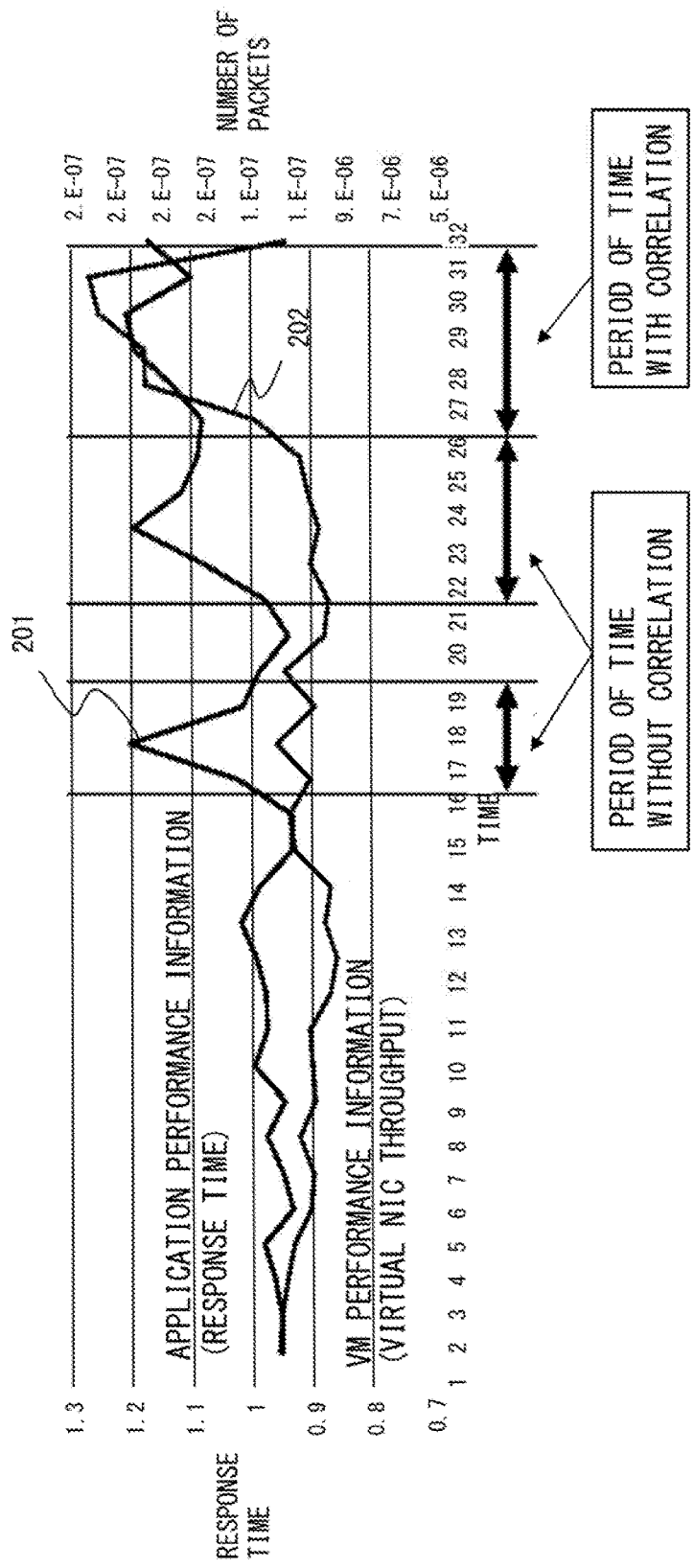
FIG. 2 illustrates an example of application performance information and VM performance information whose correlative relationship is effective only during a temporary period of time.

FIG. 2 illustrates an example of application performance information and VM performance information whose correlative relationship is effective only during a temporary period of time. FIG. 2 illustrates a correlative relationship between application performance information 201 and VM performance information 202 in the same period of time.

The application performance information 201 represents the response time of an application. In the application performance information 201, the horizontal axis represents the time axis (seconds) and the vertical axis (the left scale) represents the response time (seconds). The application performance information 201 indicates that the slower the response time is (the greater the value on the vertical axis is), the slower the application operates (the more the performance deterioration is). For example, after the 16th second on the horizontal axis, periods with the response time longer than 1 second increase, causing deterioration of the application performance information.

The VM performance information 202 represents the throughput of the virtual NIC set in the virtual machine. In the VM performance information 202, the horizontal axis represents the time axis (seconds) and the vertical axis represents the number of packets used for communications of the virtual NIC. The VM performance information 202 indicates that the greater the number of the packets is, the higher the load on the virtual NIC is. For example, after around the 27th second on the horizontal axis, the load on the virtual NIC increases.

It is now assumed that a virtual machine having a virtual NIC of the VM performance information 202 is affecting the process of an application of the application 201. When packets of a virtual NIC have increased in number for some reason (for example, the 27th second through the 32nd second on the horizontal axis), the resource shared by the virtual machine and the application becomes a bottleneck, delaying the process of the application. Between the 27th and 32nd seconds on the horizontal axis, the application performance information 201 and the VM performance information 202 both increase, meaning a high correlation between them.

Between the 17th and 20th seconds and between the 22nd and 26th seconds on the horizontal axis as well, the application performance information 201 has the response time lowered, causing performance deterioration. Meanwhile, between the 17th and 20th seconds and between the 22nd and 26th seconds on the horizontal axis, the number of packets has not increased in the VM performance information 202. Therefore, the performance deterioration between the 17th and 20th seconds and between the 22nd and 26th seconds on the horizontal axis is caused by a cause that is not the virtual machine. The application performance information 201 and the VM performance information 202 do not have a correlation during the period between the 17th and 20th seconds or between the 22nd and 26th seconds.

As described above, evaluating a correlative relationship between VM performance information and the application performance information by using a correlation coefficient when the correlative relationship between the VM performance information and the application performance information is effective only during a temporary period of time sometimes prevents the presumption of a virtual machine that caused performance deterioration.

In view of this, the present invention evaluates a correlative relationship by using, in addition to the evaluation using correlation coefficients, the reliability and the supportability of association analysis that is used in the field of data mining (reliability and supportability will collectively be referred to as a correlation rule). Thereby, the present invention can presume, with high presumption performance, a virtual machine causing performance deterioration even when the correlative relationship between the performance information of a virtual machine and the application performance information is effective only during a temporary period of time.

In the present invention, the presumption performance is specifically a recall rate (recall). A recall rate is expressed by the equation below. Recall rate=(the number of virtual machines that were able to be presumed to be causes)/(the number of virtual machines that are the causes actually). A recall rate is a value representing the degree to which virtual machines that can be causes can be presumed, and is represented by the ratio of the number of virtual machines that were able to be presumed to the number of the virtual machines that are the causes actually.

Figure 3:
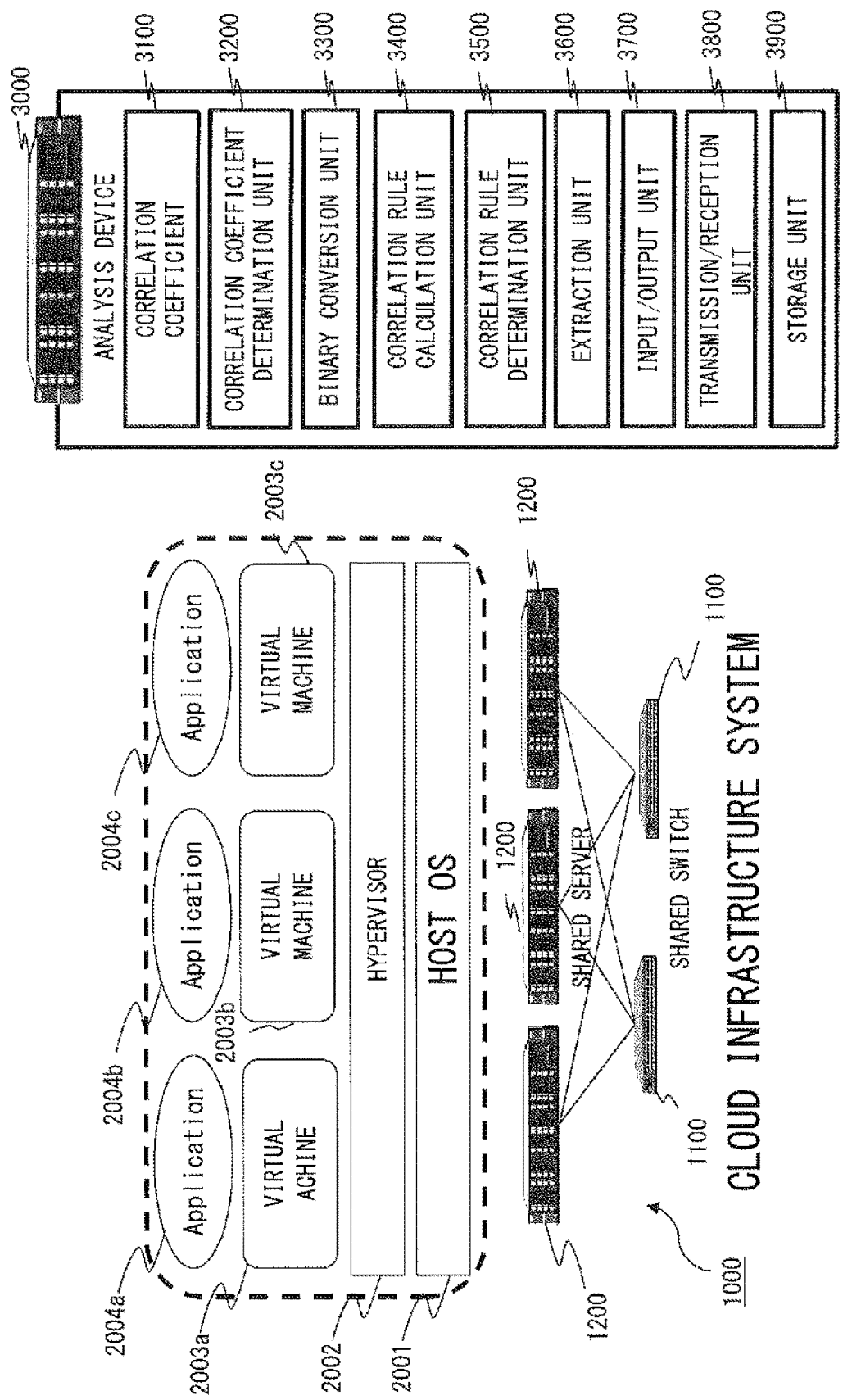
FIG. 3 illustrates examples of a cloud infrastructure system and an analysis device according to the present embodiment.

FIG. 3 illustrates examples of a cloud infrastructure system and an analysis device according to the present embodiment. The cloud infrastructure system 1000 includes the plurality of shared switches 1100 and the plurality of shared servers 1200. The plurality of shared servers 1200 can communicate each other via the shared switches 1100. The plurality of shared servers 1200 share computer resources so as to implement one cloud infrastructure system. Similarly to the shared servers 1200 illustrated in FIG. 3, the plurality of shared servers 1200 illustrated in FIG. 3 operate the host OS 2001, the hypervisor 2002, the plurality of virtual machines 2003, and the application 2004.

The system performance information of the cloud infrastructure system 1000 illustrated in FIG. 3 is transmitted to the analysis device 3000. Examples of the system performance information include the CPU use rate and the virtual CPU use rate of the server, time-series data such as network throughput, virtual NIC throughput, etc. Hereinafter, performance information related to a virtual machine such as the virtual CPU use rate, the virtual NIC throughput, etc. included in the system performance information is VM performance information. A transmission/reception unit 3800 receives VM performance information transmitted from the side of the cloud infrastructure system 1000. A storage unit 3900 stores VM performance information received by the transmission/reception unit 3800.

It is assumed that performance deterioration such as a slowdown in the processing speed of an application occurred in the application and the administrator received, from the user, application performance information of the application in order to presume a virtual machine that is causing the performance deterioration. The administrator transmits, to the analysis device 3000, the application performance information from a terminal etc. that can communicate with the analysis device 3000. The transmission/reception unit 3800 receives the application performance information of the application in which the performance deterioration occurred. The storage unit 3900 stores the application performance information received by the transmission/reception unit 3800.

When the application performance information that is the analysis target is stored in the analysis device 3000, it is possible to start a process of presuming a virtual machine causing the performance deterioration. Hereinafter, explanations will sequentially be given for the processes of presuming a virtual machine causing the performance deterioration of the analysis device 3000.

(A1) The administrator uses an input/output unit 3700 so as to select one type as an analysis target from among a plurality of types of pieces of application performance information, and makes the analysis device 3000 start a process of presuming a virtual machine causing the performance deterioration. The analysis device 3000 repeatedly performs the following processes for each one of the plurality of types VM performance information stored in the storage unit 3900.

(A2) A correlation coefficient calculation unit 3100 calculates a correlation coefficient between VM performance information (one type) and application performance information (one type).

(A3) A correlation coefficient determination unit 3200 determines whether or not the calculated correlation coefficient is equal to or smaller than a prescribed no-correlation determination threshold (equal to or smaller than 0.3 for example). When the calculated correlation coefficient is equal to or smaller than the prescribed no-correlation determination threshold (equal to or smaller than 0.3 for example), the type of VM performance information is excluded from the analysis target. When the type of the VM performance information of the calculated correlation coefficient is excluded, the process is repeated from (A2) for another type of VM performance information.

(A4) The correlation coefficient determination unit 3200 determines whether or not the calculated correlation coefficient has a correlation coefficient greater than a prescribed correlation determination threshold (equal to or greater than 0.8 for example).

(A4.1) When the calculated correlation coefficient has a correlation coefficient greater than the prescribed correlation determination threshold (equal to or greater than 0.8 for example), the analysis device 3000 performs the process of (A11).

(A4.2) When the calculated correlation coefficient has a correlation coefficient smaller than the prescribed correlation determination threshold (equal to or greater than 0.8 for example), the analysis device 3000 performs the process from (A5).

(A5) A binary conversion unit 3300 converts the application performance information into binary data on the basis of an application binary conversion threshold (which will be explained in detail in FIG. 5). This process does not have to be performed a plurality of times.

(A6) The binary conversion unit 3300 selects, as a threshold, "x", which is data at a time in VM performance information, and converts the selected VM performance information into binary data (which will be explained in detail in FIG. 6A and FIG. 6B).

(A7) A correlation rule calculation unit 3400 calculates a reliability and a supportability (correlation rule) used in association analysis that is utilized in the field of data mining (which will be explained in detail in FIG. 7).

(A8) The analysis device 3000 repeatedly performs the processes of (A6) and (A7), in which all times in the VM performance information are set as threshold "x".

(A9) A correlation rule determination unit 3500 determines threshold "X" (the threshold resulting in maximum supportability from among the plurality of thresholds x is referred to as X) that results in the maximum supportability from among thresholds "x" for which the calculated reliability is equal to or greater than the prescribed threshold (equal to or greater than 0.8 for example).

(A10) The binary conversion unit 3300 uses threshold "X" with the maximum supportability of the VM performance information so as to convert each VM performance information into binary data (which will be explained in detail in FIG. 6A and FIG. 6B).

(A11) When it is determined in the process of (A4.1) that the calculated correlation coefficient is a correlation coefficient greater than the prescribed correlation determination threshold (equal to or greater than 0.8 for example), an extraction unit 3600 extracts the type of the VM performance information that is currently being analyzed. The VM performance information extracted then is VM performance information as a candidate for the cause of the performance deterioration (A12) The extraction unit 3600 extracts VM performance information with supportability (correlation rule) greater than the prescribed threshold (which will be explained in detail in FIG. 8). The VM performance information extracted then is VM performance information that as a candidate for the cause of the performance deterioration.

(A13) The analysis device 3000 repeatedly performs the processes of (A2) through (A12) for each one of the plurality of types VM performance information.

(A14) The input/output unit 3700 displays, in the monitor, VM performance information extracted by the extraction unit 3600. The administrator can presume a virtual machine causing the performance deterioration from the displayed VM performance information.

The present invention evaluates a correlative relationship by using, in addition to the evaluation using correlation coefficients, the reliability and the supportability of association analysis that is used in the field of data mining. Thereby, the present invention can presume a virtual machine causing performance deterioration even when the correlative relationship between the VM performance information and the application performance information is effective only during a temporary period of time.

Figure 4:
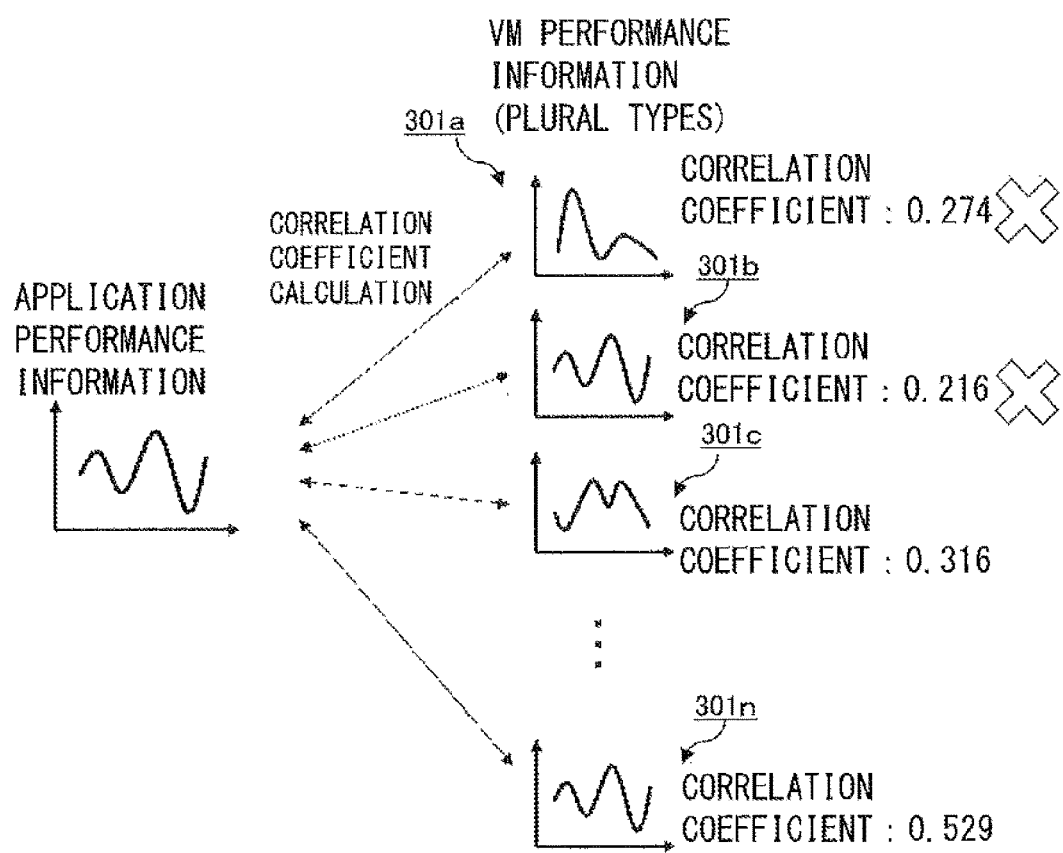
FIG. 4 illustrates an example of an exclusion process of the correlation coefficient determination unit.

FIG. 4 illustrates an example of an exclusion process of the correlation coefficient determination unit. FIG. 4 illustrates an example of the processes of (A2) and (A3). The correlation coefficient calculation unit 3100 calculates a correlation coefficient between each of a plurality of various types of VM performance information and one type of application performance information. FIG. 4 illustrates correlation coefficients between respective pieces of VM performance information 301a through 301n corresponding to one type of application performance information.

In FIG. 4, the correlation coefficient of the VM performance information 301a corresponding to the application performance information is "0.274". The correlation coefficient of the VM performance information 301b corresponding to the application performance information is "0.216". The correlation coefficient of the VM performance information 301c corresponding to the application performance information is "0.316". The correlation coefficient of the VM performance information 301n corresponding to the application performance information is "0.529".

In the process of (A3), the correlation coefficient determination unit 3200 excludes, from the analysis target, types of VM performance information having a correlation coefficient that is equal to or smaller than a prescribed no-correlation determination threshold (equal to or smaller than 0.3 for example). In the example illustrated in FIG. 4, the correlation coefficients of the VM performance information 301a and the VM performance information 301b are equal to or smaller than the prescribed no-correlation determination threshold, and are thereby excluded.

Figure 5:
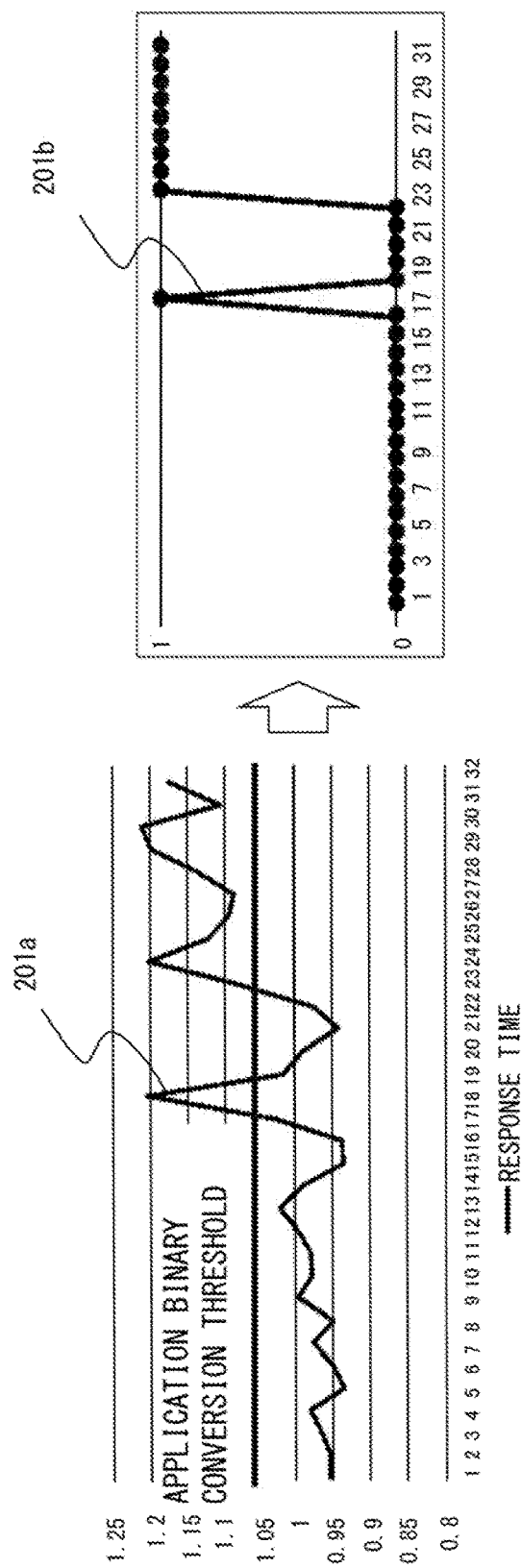
FIG. 5 illustrates an example of a binary conversion process of application performance information.

FIG. 5 illustrates an example of a binary conversion process of application performance information. Application performance information 201a illustrated in FIG. 5 is for example a response time of the application. In the application performance information 201a, the horizontal axis represents the time axis and the vertical axis represents the response time. The application performance information 201a illustrated in FIG. 5 is the same as the application performance information 201 illustrated in FIG. 2.

An application binary conversion threshold is set in the binary conversion unit 3300. The application binary conversion threshold is set by for example the administrator. The application binary conversion threshold may be set on the basis of a value that is defined by the administrator as a value that clearly indicates that the value of the application performance information 201a (response time) has become a value that is not a normal value. Also, the administrator may set the application binary conversion threshold from a past statistical value.

In the application performance information 201a (response time), the binary conversion unit 3300 converts data in a period of time that exceeds the application binary conversion threshold into "1" and also converts data in a period of time that is equal to or smaller than the application binary conversion threshold into "0". Note that a binary value that is not 0 or 1 can also be used.

Application performance information 201b illustrated in FIG. 5 is an example of the application performance information 201a that received binary conversion. The response time of the application performance information 201a exceeds the application binary conversion threshold in the portions at the 18th second and after the 24th second on the horizontal axis. Accordingly, in the application performance information 201b, the portions after the 18th and 24th seconds on the horizontal axis have a value of 1, and the other periods of time have a value of 0.

As described above, the binary conversion unit 3300 performs binary conversion on application performance information so that it is used for association analysis.

Figure 6B:
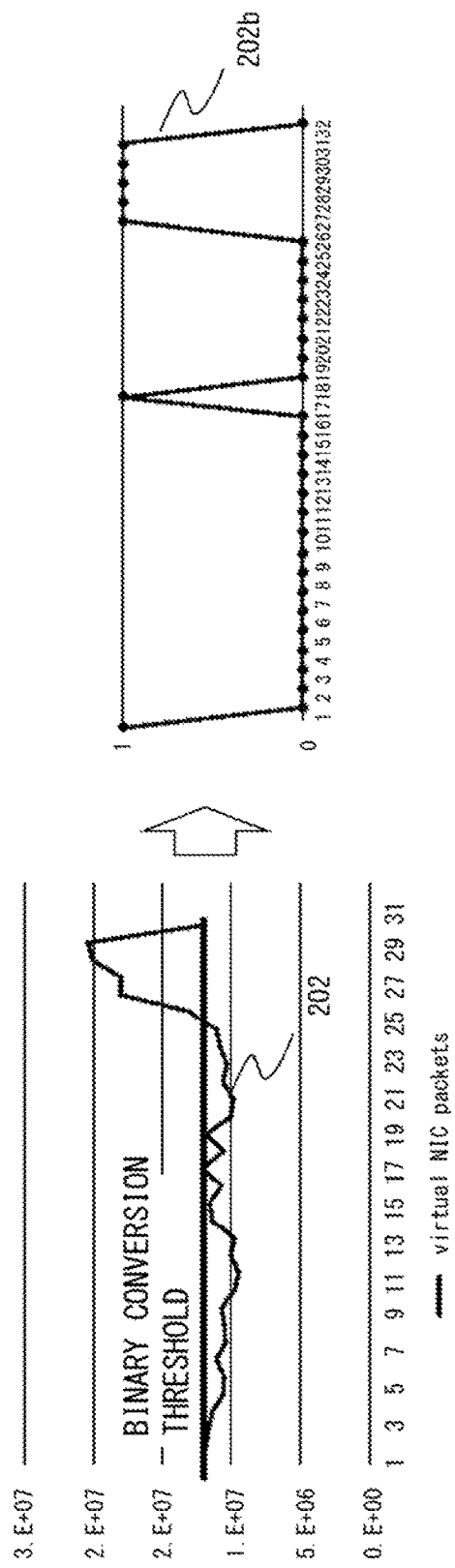
FIG. 6B explains an example of a binary conversion process of VM performance information.

FIG. 6A and FIG. 6B explain an example of a binary conversion process of VM performance information. The VM performance information 202 illustrated in FIG. 6A is the same as the VM performance information 202 illustrated in FIG. 2. VM performance information 202' is an example of the time of the VM performance information 202 and the number of packets that are transmitted and received at that time.

The binary conversion unit 3300 selects, as a threshold, data "x" at a time in the selected VM performance information, and converts the selected VM performance information into binary data. The binary conversion unit 3300 for example selects, as threshold "x", "11851874.8", which is at the 1st second, and performs binary conversion on the VM performance information by using the threshold. The correlation rule calculation unit 3400 uses the application performance information and the value of the VM performance information after receiving binary conversion so as to calculate the reliability and the supportability (correlation rule).

Thereafter, the binary conversion unit 3300 selects threshold "x" between for example the 2nd and 32nd seconds so as to sequentially perform binary conversion on VM performance information. In the example illustrated in FIG. 6A, 32 thresholds "x" used for binary conversion and 32 reliabilities and supportabilities are calculated. The correlation rule determination unit 3500 determines threshold "X" with the maximum supportability from among thresholds equal to or greater than a prescribed threshold (equal to or greater than 0.8 for example) from among the calculate 32 reliabilities. Note that threshold "X" resulting in the maximum supportability is determined for each type of VM performance information.

FIG. 6B illustrates the VM performance information 202 and VM performance information 202b obtained by performing binary conversion on the VM performance information 202. Specifically, the binary conversion unit 3300 performs binary conversion on the VM performance information 202 in the processes of (A6) and (A10).

The binary conversion unit 3300 performs binary data conversion using, as threshold, data "x" of a plurality of (all times) pieces of data for one type of VM performance information in the process of (A6). Accordingly, the binary conversion unit 3300 performs binary conversion 32 times for one type of VM performance information with 32 thresholds as illustrated in FIG. 6A.

Thereafter, the correlation rule determination unit 3500 determines threshold "X" with the maximum supportability from among thresholds equal to or greater than a prescribed threshold (equal to or greater than 0.8 for example) from among the calculated 32 reliabilities. Then, the binary conversion unit 3300 uses threshold "X" with the maximum supportability for each type of VM performance information so as to convert each piece of VM performance information into binary data (process of (A10)).

In the VM performance information 202, the binary conversion unit 3300 converts data of a period of time exceeding threshold "X" into "1" and converts data of a period of time equal to or smaller than threshold "X" into "0". Note that a binary value that is not 0 or 1 may also be used.

As described above, the binary conversion unit 3300 performs binary conversion on VM performance information so as to use it for association analysis.

Figure 7:
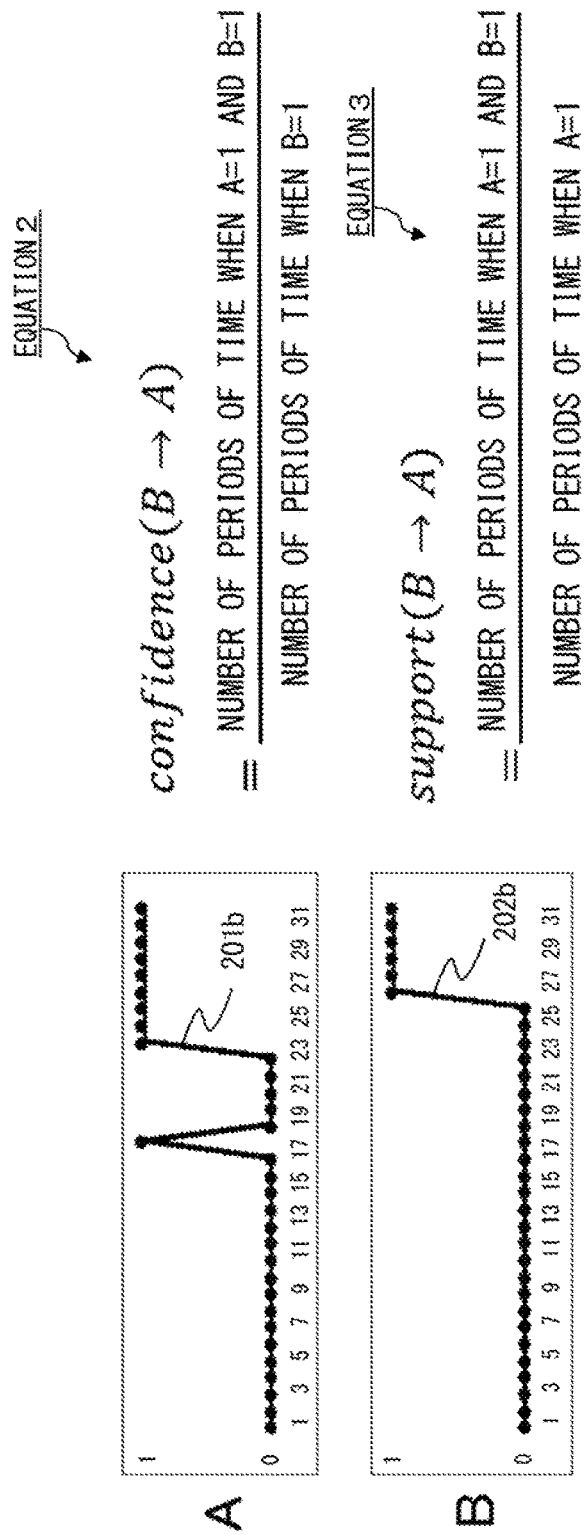
FIG. 7 illustrates an example of a calculation method of a reliability and a supportability.

FIG. 7 illustrates an example of a calculation method of a reliability and a supportability. FIG. 7 illustrates an example of the application performance information 201b of FIG. 5 and the VM performance information 202b of FIG. 6B that received binary conversion. The correlation rule calculation unit 3400 uses the application performance information 201b and the VM performance information 202b so as to calculate the reliability and the supportability. The equation of the reliability and the supportability is based on association analysis. Association analysis is explained in detail by "Agrawal, Rakesh, Tomasz Imielinski, and Arun Swami. Mining Association Rules Between Sets of Items in Large Database. In Proc. Of the 1993 ACM SIGMOD International Conference on Management of Data, 1993".

A reliability is represented by the equation below.

reliability $(B \Rightarrow A)$=(number of periods of time where
$A$=1 and $B$=1)/(number of periods of time
where $B$=1)

There are 10 periods of time where the value of application performance information 201a is 1 at the 18th second and between the 24th and 32nd seconds. There are 6 periods of time where the value of the VM performance information 202b is 1 between the 27th and 32nd seconds. There are 6 periods of time where the values of the application performance information 201a and the VM performance information 202b are 1 between the 27th and 32nd seconds. Thus, the denominator and the numerator of the reliability (confidence) are 6 and 6, respectively. The reliability (confidence) of the application performance information 201a and the VM performance information 202b is 1.

The supportability is represented by the equation bellow.

supportability $(B \Rightarrow A)$=(number of periods of time
where $A$=1 and $B$=1)/(number of periods of
time where $A$=1)

There are 6 periods of time where the values of application performance information 201a and the VM performance information 202b are 1 at between the 27th and 32nd seconds. There are 10 periods of time where the value of application performance information 201a is 1 at the 18th second and between the 24th and 32nd seconds. Thus, the denominator and the numerator of the supportability are 10 and 6, respectively. The supportability (support) of the application performance information 201a and the VM performance information 202b is 0.6.

Thereby, even application performance information and VM performance information having a temporary correlative relationship have a high value as the reliability in association analysis.

Figure 8:
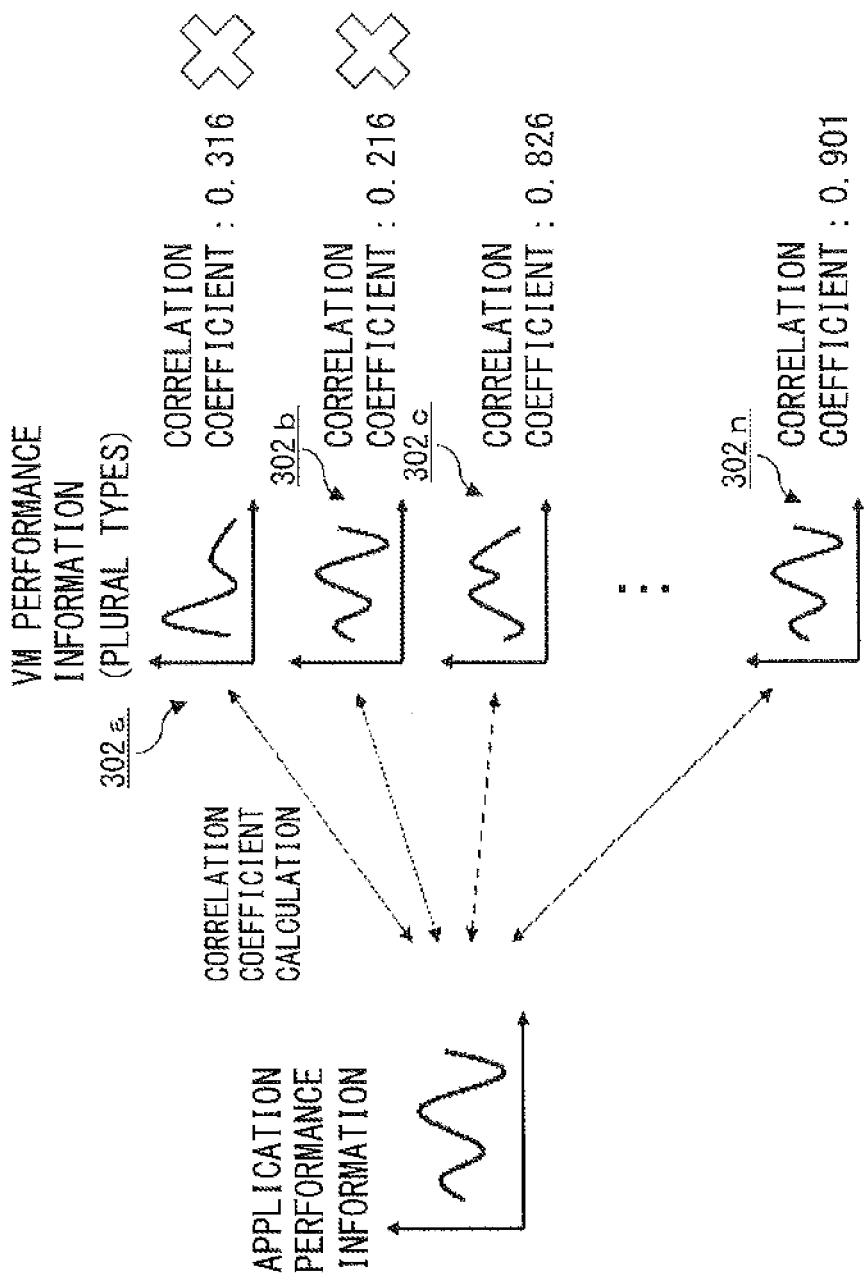
FIG. 8 illustrates an example of a process of an extraction unit.

FIG. 8 illustrates an example of a process of an extraction unit. FIG. 8 illustrates an example of the process of (A11). FIG. 8 illustrates correlation coefficients of the respective pieces of VM performance information 302a through 302n corresponding to one type of application performance information.

In FIG. 8, the correlation coefficient of the VM performance information 302a corresponding to the application performance information is "0.316". The correlation coefficient of the VM performance information 302b corresponding to the application performance information is "0.216". The correlation coefficient of the VM performance information 302c corresponding to the application performance information is "0.826". The correlation coefficient of the VM performance information 302n corresponding to the application performance information is "0.901".

In the process of (A11), the extraction unit 3600 extracts a type of VM performance information having a correlation coefficient greater than a prescribed correlation determination threshold value (equal to or greater than 0.8 for example), as a candidate for a virtual machine having a cause for performance deterioration. In the example illustrated in FIG. 8, the VM performance information 302c, the VM performance information 302n, etc. are extracted as candidates for virtual machines having a cause for performance deterioration.

The processes of (A6) through (A10) are not executed for types of VM performance information having a correlation coefficient greater than a prescribed correlation determination threshold (equal to or greater than 0.8 for example). This can reduce the amount of calculations performed by the analysis device 3000. Note that, in the process of (A11), the extracted type of VM performance information is extracted as a candidate for a virtual machine having a cause as a type having a high possibility of being a cause for performance deterioration.

FIG. 9 illustrates examples of an application performance information table and a VM performance information table. Application performance information is stored in the storage unit 3900 as illustrated in the example of an application performance information table 5001 illustrated in FIG. 9. The application performance information table 5001 includes items for time of day and value. A time of day is a time at which the application performance information is obtained. The value is a numerical value related to the type of application performance information corresponding to a time of day.

VM performance information is stored in the storage unit 3900 as illustrated in the example of a VM performance information table 5002 illustrated in FIG. 9. The VM performance information table 5002 includes items for VM name, performance information name, time of day and value. A VM name is represented by identification information for identifying a virtual machine for which VM performance information is obtained. A performance information name is information representing the type of VM performance information. A time of day is a time at which the VM performance information is obtained. The value is a numerical value related to the type of VM performance information corresponding to a time of day.

Figure 10A:
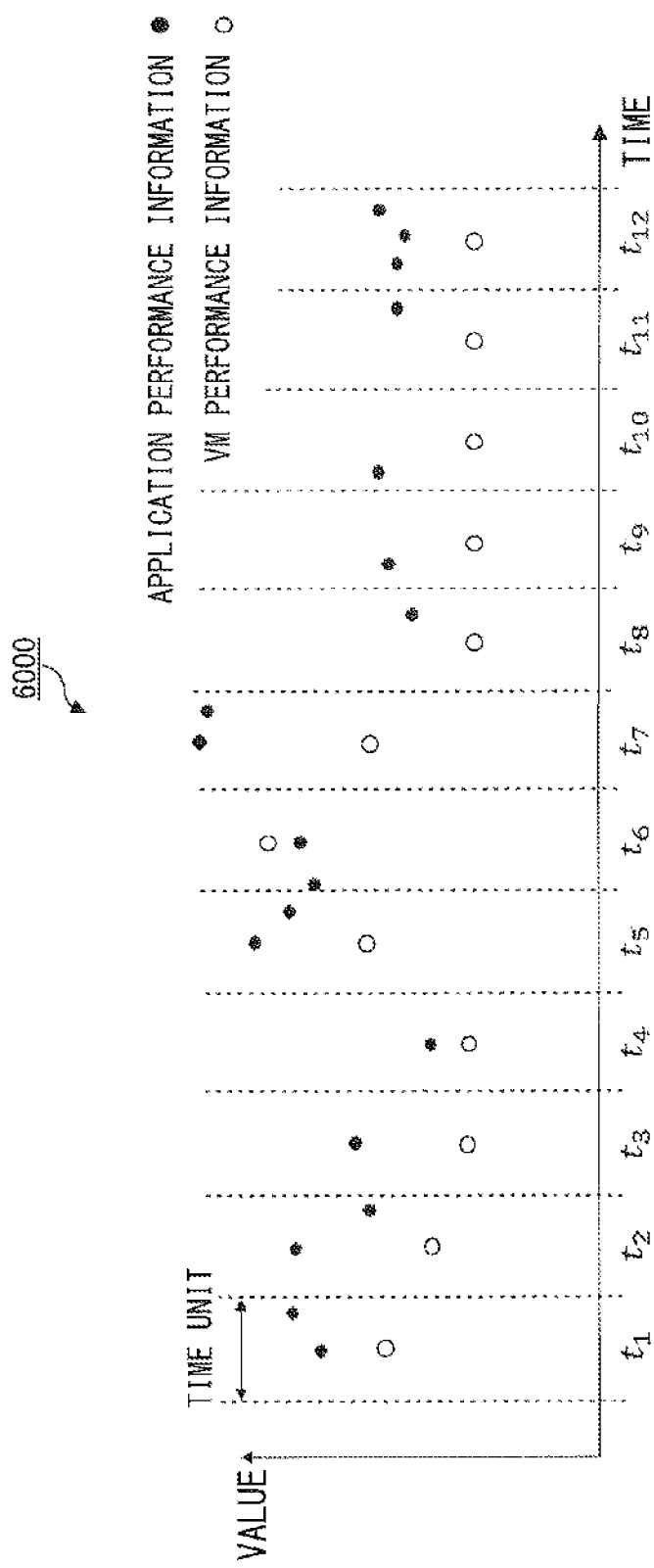
FIG. 10A illustrates an example of a process of a correlation coefficient calculation unit.

FIG. 10A and FIG. 10B illustrate an example of a process of a correlation coefficient calculation unit. A table 6000 illustrated in FIG. 10A illustrates application performance information and VM performance information, with the horizontal value being the time axis and the vertical axis illustrating values of application performance information and VM performance information.

A situation can be assumed where not all time stamps of the pieces of application performance information and VM performance information are provided. When not all time stamps are provided, it is not possible to calculate a correlation coefficient of application performance information and VM performance information at the same time of day. Because of this, the correlation coefficient calculation unit 3100 according to the present embodiment sets a prescribed time range as a time unit so as to calculate a correlation coefficient of application performance information and VM performance information included in the set time unit.

Where there are a plurality of values of VM performance information in the same time unit, the average value of the plurality of values is treated as the value corresponding to the time unit. Also, when there are two values of application performance information in the same time unit, the average value of the two values is treated as the value of the time unit.

From application performance information and VM performance information, the correlation coefficient calculation unit 3100 generates data pair information 6100 (FIG. 10B) including application performance information and VM performance information for each time unit. Data pair information includes items for time unit, application performance information and VM performance information. A time unit is represented by information representing each unit obtained by separating a prescribed range of time such as $t_1$ through $t_{12}$. Application performance information is a value related to the type of performance information of an application in the time unit or the average value thereof. VM performance information is a value related to the type of virtual machine performance information in the time unit or the average value thereof.

As described above, by separating values of VM performance information and application performance information, the correlation coefficient calculation unit 3100 can calculate a correlation coefficient between VM performance information and application performance information even when there is a shift between time stamps of VM performance information and application performance information.

FIG. 11 illustrates an example of a calculation result table of correlation coefficients. The correlation coefficient calculation unit 3100 calculates a value of a correlation coefficient of VM performance information corresponding to application performance information (one type) (process in (A2)). Result information 6200 of a correlation coefficient is an example of a value of a correlation coefficient of VM performance information corresponding to application performance information (one type). The result information 6200 of a correlation coefficient includes VM name, performance information name, and correlation coefficient.

A VM name is represented by identification information for identifying a virtual machine for which VM performance information is obtained. A performance information name is information representing the type of performance information in a virtual machine. A correlation coefficient is a value of a correlation coefficient of VM performance information corresponding to application performance information (one type).

FIG. 12 illustrates an example of a correlation determination information table. The correlation determination information table 6300 is an example of a correlation determination threshold and a no-correlation determination threshold. A correlation determination threshold is used by the correlation coefficient determination unit 3200 in the process of (A4). The correlation coefficient determination unit 3200 excludes, from the processes of (A6) through (A10), VM performance information having a correlation coefficient greater than the correlation determination threshold. Further a correlation determination threshold is used by the extraction unit 3600 in the process of (A11). Thereby, VM performance information having a correlation coefficient greater than the correlation determination threshold is extracted as a candidate for a virtual machine causing performance deterioration of the application.

A no-correlation determination threshold is used by the correlation coefficient determination unit 3200 in the process of (A3). VM performance information having a correlation coefficient smaller than the no-correlation determination threshold is excluded from the subsequent processes.

Figure 13:
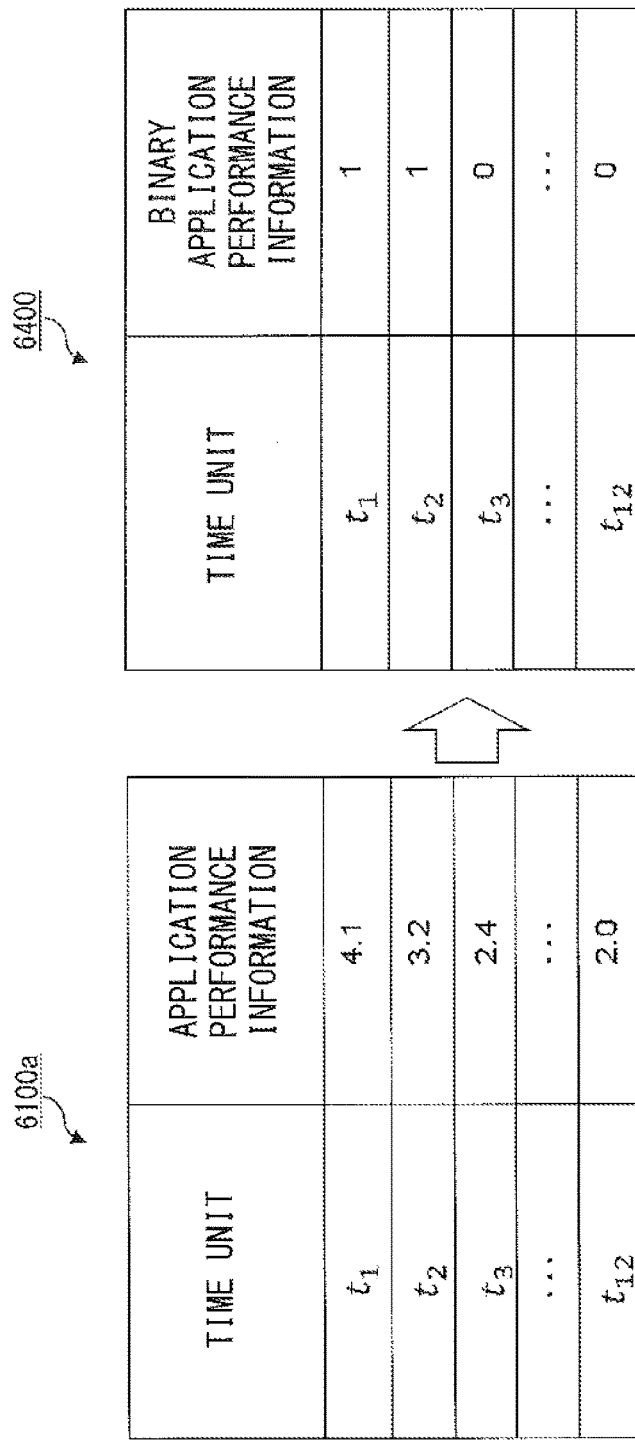
FIG. 13 illustrates an example of application performance information that received binary conversion.

FIG. 13 illustrates an example of application performance information that received binary conversion. The example of application performance information 6100a illustrated in FIG. 13 illustrates the application-performance-information side in the application performance information 6100a illustrated in FIG. 10B. The binary conversion unit 3300 converts one type of application performance information into binary data on the basis of an application binary conversion threshold.

A binary application performance information table 6400 is information obtained by performing binary conversion on the value of the application performance information 6100a illustrated in FIG. 13. The binary application performance information table 6400 includes items for time unit and binary value application performance information. This process is a process executed in (A5). Application performance information having received binary conversion is used for association analysis.

Figure 14:
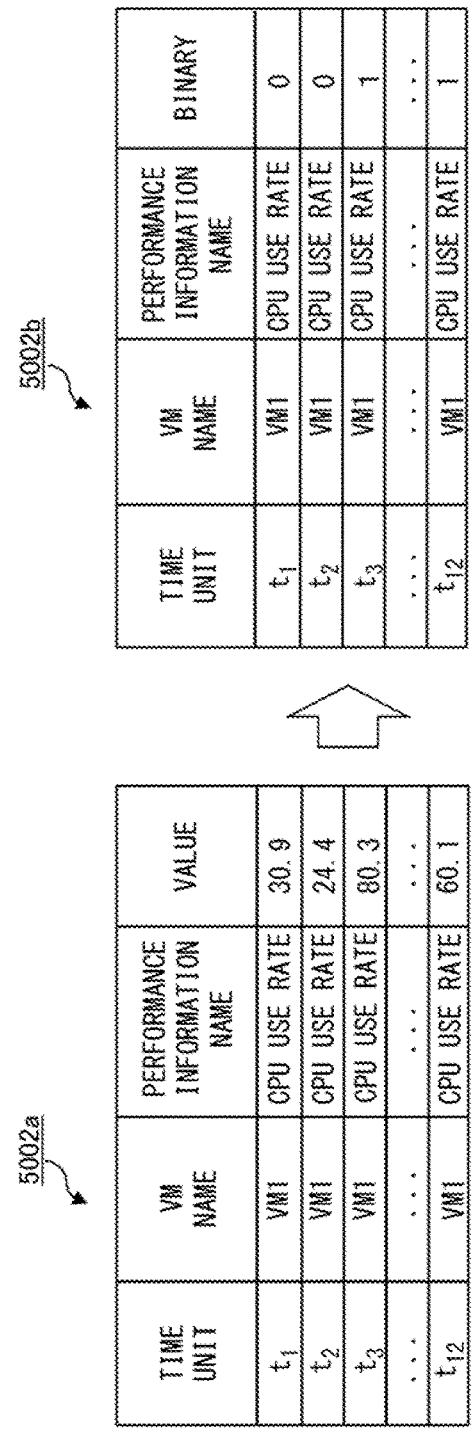
FIG. 14 illustrates an example of VM performance information that received binary conversion.

FIG. 14 illustrates an example of VM performance information that received binary conversion. A VM performance information table 5002a illustrated in FIG. 14 is a table obtained after the VM performance information table 5002 of FIG. 9 had the values of the respective pieces of VM performance information converted into time units by the correlation coefficient calculation unit 3100. The VM performance information table 5002a illustrated in FIG. 14 includes items for time unit, VM name, performance information name and value. The items for VM names, performance information names and values are the same as those in the VM performance information table 5002 illustrated in FIG. 9.

The binary conversion unit 3300 converts the VM performance information table 5002a into binary data on the basis of a VM binary conversion threshold so as to generate a VM performance information table 5002. A VM binary conversion threshold is data "x" at a time in selected VM performance information. A VM binary conversion threshold in the process of (A10) is "X" for which the supportability for each piece of VM performance information is maximum. VM performance information having received binary conversion is used for association analysis.

Figure 15:
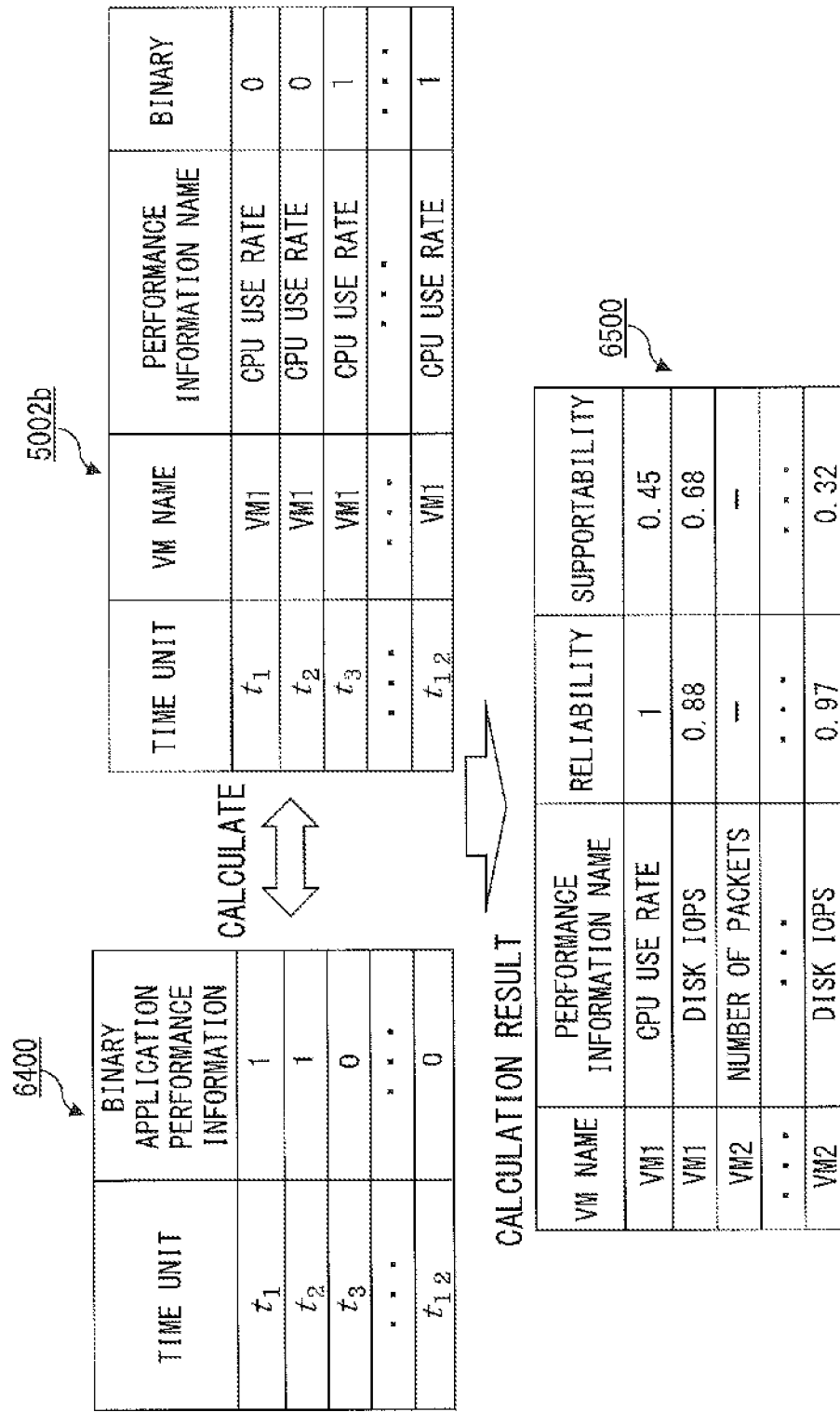
FIG. 15 illustrates an example of a calculation result of a correlation rule.

FIG. 15 illustrates an example of a calculation result of a correlation rule. In the process of (A7), the correlation rule calculation unit 3400 uses the binary application performance information table 6400 illustrated in FIG. 13 and the VM performance information table 5002b illustrated in FIG. 14 so as to calculate a reliability and a supportability (correlation rule).

The correlation rule calculation unit 3400 generates a calculation result table 6500 after calculating a reliability and a supportability (correlation rule). The storage unit 3900 stores the calculation result table 6500. The calculation result table 6500 includes items for VM name, performance information name, reliability and supportability. Note that when there are no values of VM performance information that can be selected as a threshold in a time unit, the correlation rule calculation unit 3400 sets a blank (or 0) for the reliability and the supportability.

Figure 16B:
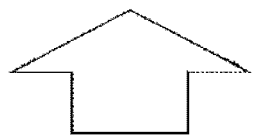
FIG. 16B illustrates an example of an extraction process of an extraction unit.

FIG. 16A and FIG. 16B illustrate an example of an extraction process of an extraction unit. The extraction unit 3600 in the process of (A11) extracts VM performance information having a correlation coefficient greater than a prescribed correlation determination threshold (equal to or greater than 0.8 for example). Further, in the process of (A12), the extraction unit 3600 extracts VM performance information with a reliability greater than a prescribed threshold (equal to or greater than 0.8 for example) and with a supportability greater than a prescribed threshold (equal to or greater than 0.2 for example).

Then, the extraction unit 3600 extracts VM performance information 6200a from the result information 6200 of a correlation coefficient illustrated in FIG. 11. Further, the extraction unit 3600 extracts VM performance information 6500a with a reliability equal to or greater than 0.8 and a supportability equal to or greater than 0.2 from the calculation result table 6500 illustrated in FIG. 15.

The extraction unit 3600 calculates the sum of correlation coefficients for each virtual machines on the basis of the VM performance information 6200a and the VM performance information 6500a. A cause-candidate VM is represented by a virtual machine name extracted as a cause for application performance deterioration. Thereafter, the 3600 assigns priority (high, intermediate and low) to each virtual machine on the basis of the sum of correlation coefficients for each virtual machine. Priority represents whether or not a virtual machine has a high possibility of being a cause of application performance deterioration.

Figure 17:
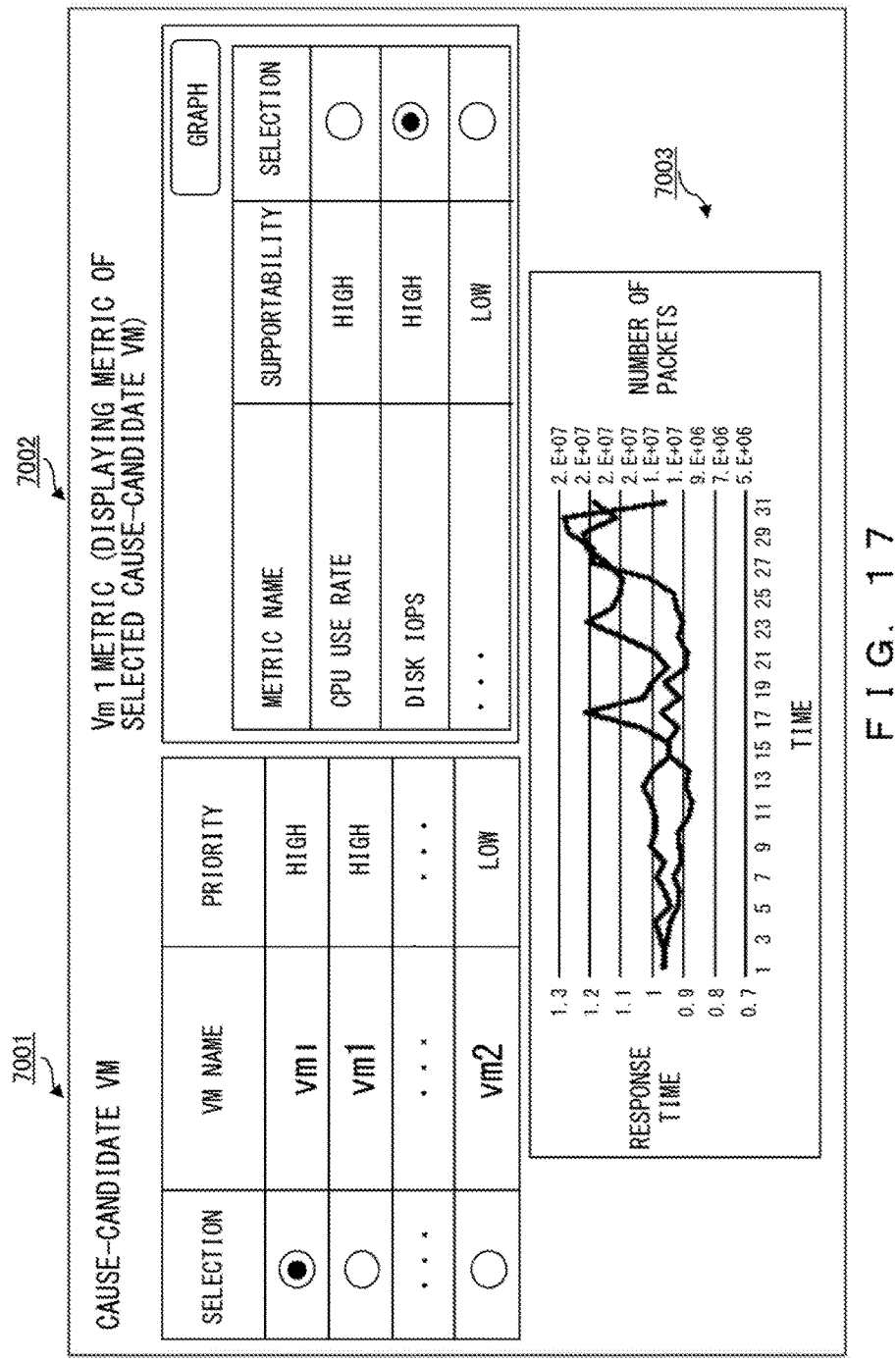
FIG. 17 illustrates an example of an output window of an input/output unit.

FIG. 17 illustrates an example of an output window of an input/output unit. An input/output unit 3700 displays, in the monitor, VM performance information extracted by the extraction unit 3600. Selection buttons, VM names and priority are displayed on the frame of a cause-candidate VM 7001 displayed on the monitor. A VM name is identification information for identifying a virtual machine. Priority represents whether a possibility of a virtual machine assigned on the basis of the sum of correlation coefficients of virtual machines by the extraction unit 3600 being a cause of application performance deterioration is high or low.

The administrator selects one virtual machine through a selection button on the frame of the cause-candidate VM 7001. Then, the metric name, the supportability and the selection button corresponding to the selected virtual machine are displayed on the frame of a virtual machine metric 7002. The metric name and the supportability displayed on the frame of the virtual machine metric 7002 are based on the VM performance information 6500a extracted by the extraction unit 3600.

The administrator selects one metric by clicking a selection button on the frame of the virtual machine metric 7002. Then, a graph 7003 including a analysis-target application performance information and the VM performance information of the selected metric is displayed on the monitor. The administrator uses the cause-candidate VM 7001, the virtual machine metric 7002 and the graph 7003 displayed on the monitor and thereby can presume a virtual machine causing application performance deterioration from the extracted VM performance information etc.

FIG. 18 illustrates an example of a hardware configuration of an analysis device. The analysis device 3000 includes a processor 11, a memory 12, a bus 15, an external storage device 16 and a network connection device 19. Further, the analysis device 3000 may optionally include an input device 13, an output device 14 and a medium driving device 17. The analysis device 3000 may be implemented by for example a computer.

An arbitrary processing circuit including a Central Processing Unit(CPU) may be used for the processor 11. The processor 11 operates as the correlation coefficient calculation unit 3100, the correlation coefficient determination unit 3200, the binary conversion unit 3300, the correlation rule calculation unit 3400, the correlation rule determination unit 3500 and the extraction unit 3600. The processor 11 can execute a program stored in for example the external storage device 16. The memory 12 operates as the storage unit 3900. Further, the memory 12 on an as-needed basis stores data obtained through operations of the processor 11 and data used for processes of the processor 11. The network connection device 19 operates as the transmission/reception unit 3800 and is used for communications with other devices.

The input device 13 is implemented as for example a button, a keyboard, a mouse, etc., and the output device 14 is implemented as for example a display device. The input device 13 and the output device 14 operate as the input/output unit 3700. The bus 15 connects the processor 11, the memory 12, the input device 13, the output device 14, the external storage unit 16, the medium driving device 17 and the network connection device 19 to each other so that data can be exchanged between them. The external storage unit 16 stores a program, data, etc. and provides stored data to the processor 11 etc. on an as-needed basis. The medium driving device 17 can output data in the memory 12 or the external storage unit 16 to a portable storage medium 18, and can also read a program, data etc. from the portable storage medium 18. In this example, the portable storage medium 18 may be an arbitrary portable storage medium including a Magneto-Optical (MO) disk, a Compact Disc Recordable (CD-R), and a Digital Versatile Disk Recordable (DVD-R).

Figure 19A:
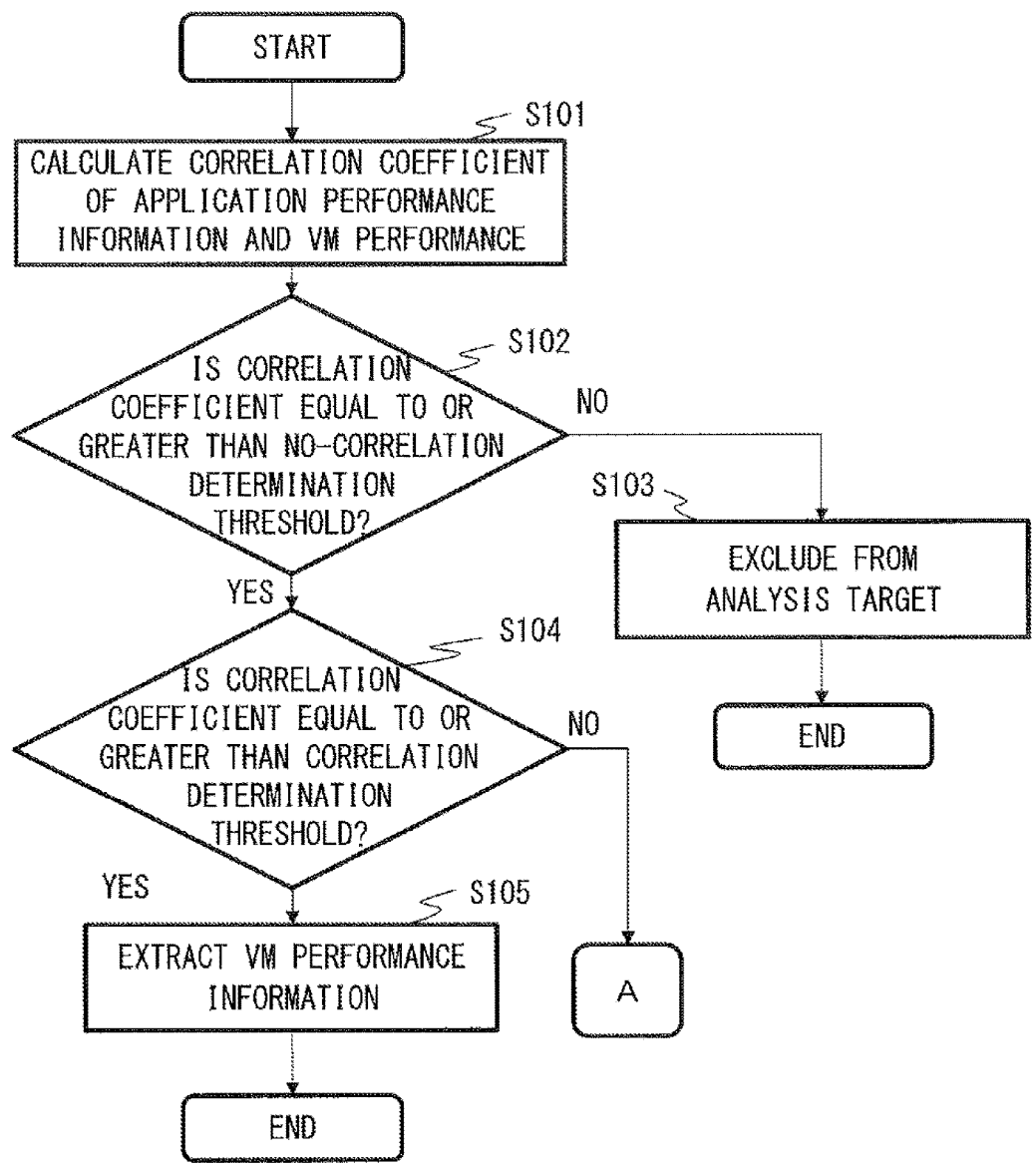
FIG. 19A is a flowchart illustrating an example of a process of an analysis device.
Figure 19B:
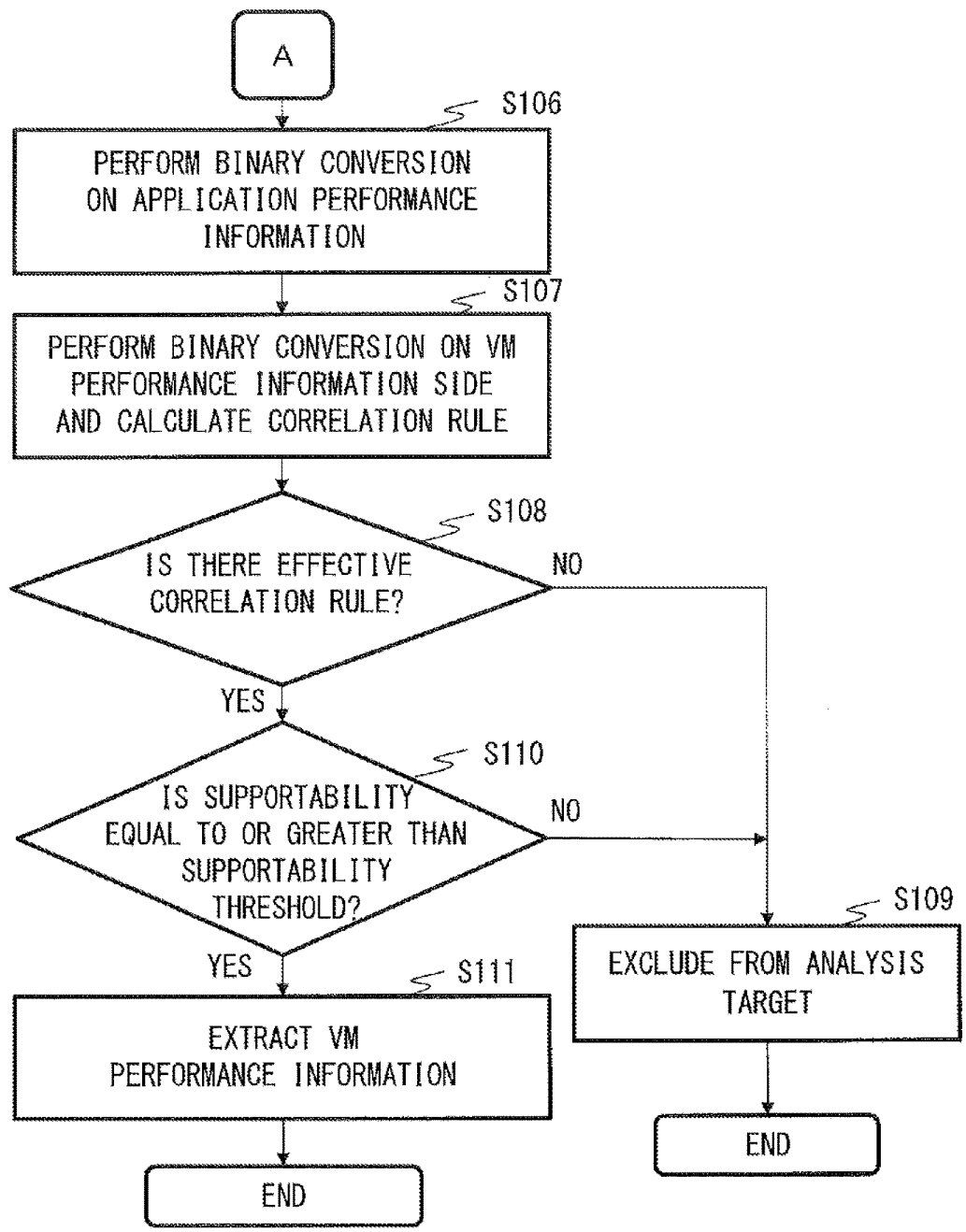
FIG. 19B is a flowchart illustrating an example of a process of an analysis device.

FIG. 19A and FIG. 19B are flowcharts explaining an example of a process of an analysis device. The process of the flowchart illustrated in FIG. 19 is executed for each type of VM performance information. The correlation coefficient calculation unit 3100 calculates a correlation coefficient of VM performance information (one type) and application performance information (one type) (step S101). The correlation coefficient determination unit 3200 determines whether or not the calculated correlation coefficient is equal to or smaller than a prescribed no-correlation determination threshold (equal to or smaller than 0.3 for example) (step S102). When the calculated correlation coefficient is equal to or smaller than the prescribed no-correlation determination threshold (equal to or smaller than 0.3 for example) (No in step S102), the correlation coefficient determination unit 3200 excludes the type of the VM performance information from the analysis target (step S103). The analysis device 3000 terminates the analysis process of this VM performance information (one type).

The correlation coefficient determination unit 3200 determines whether or not the calculated correlation coefficient has a correlation coefficient greater than a prescribed correlation determination threshold (equal to or greater than 0.8 for example) (step S104). When the calculated correlation coefficient has a correlation coefficient greater than the prescribed correlation determination threshold (equal to or greater than 0.8 for example) (Yes in step S104), the extraction unit 3600 extracts the type of the VM performance information that is currently being analyzed, as VM performance information that is a candidate for a cause of performance deterioration. The analysis device 3000 terminates the analysis process on this VM performance information (one type).

When the calculated correlation coefficient has a correlation coefficient smaller than the prescribed correlation determination threshold (equal to or greater than 0.8 for example) (No in step S104), the binary conversion unit 3300 converts the application performance information into binary data on the basis of an application binary conversion threshold (step S106). Note that when the binary data of application performance information has once been obtained, the process of step S106 is skipped for other types of VM performance information.

The analysis device 3000 executes binary conversion of VM performance information and calculation of a correlation rule (step S107). The process in step S107 will be explained in detail in FIG. 20.

The extraction unit 3600 determines whether or not an effective correlation rule exists (step S108). When an effective correlation rule does not exist (No in step S108), the correlation coefficient determination unit 3200 excludes the type of the VM performance information from the analysis target (step S109). The analysis device 3000 terminates the analysis process on this VM performance information (one type). When an effective correlation rule exists (Yes in step S108), the extraction unit 3600 determines whether or not the supportability of the effective correlation rule is greater than a supportability threshold (step S110). When the supportability is not greater than the supportability threshold (No in step S110), the analysis device 3000 executes process in step S109. When the supportability is greater than the supportability threshold (Yes in step S110), the extraction unit 3600 extracts the type of the VM performance information that is currently being analyzed, as VM performance information that is a candidate for a cause of performance deterioration (step S111). The analysis device 3000 terminates the analysis process on this VM performance information (one type).

Figure 20:
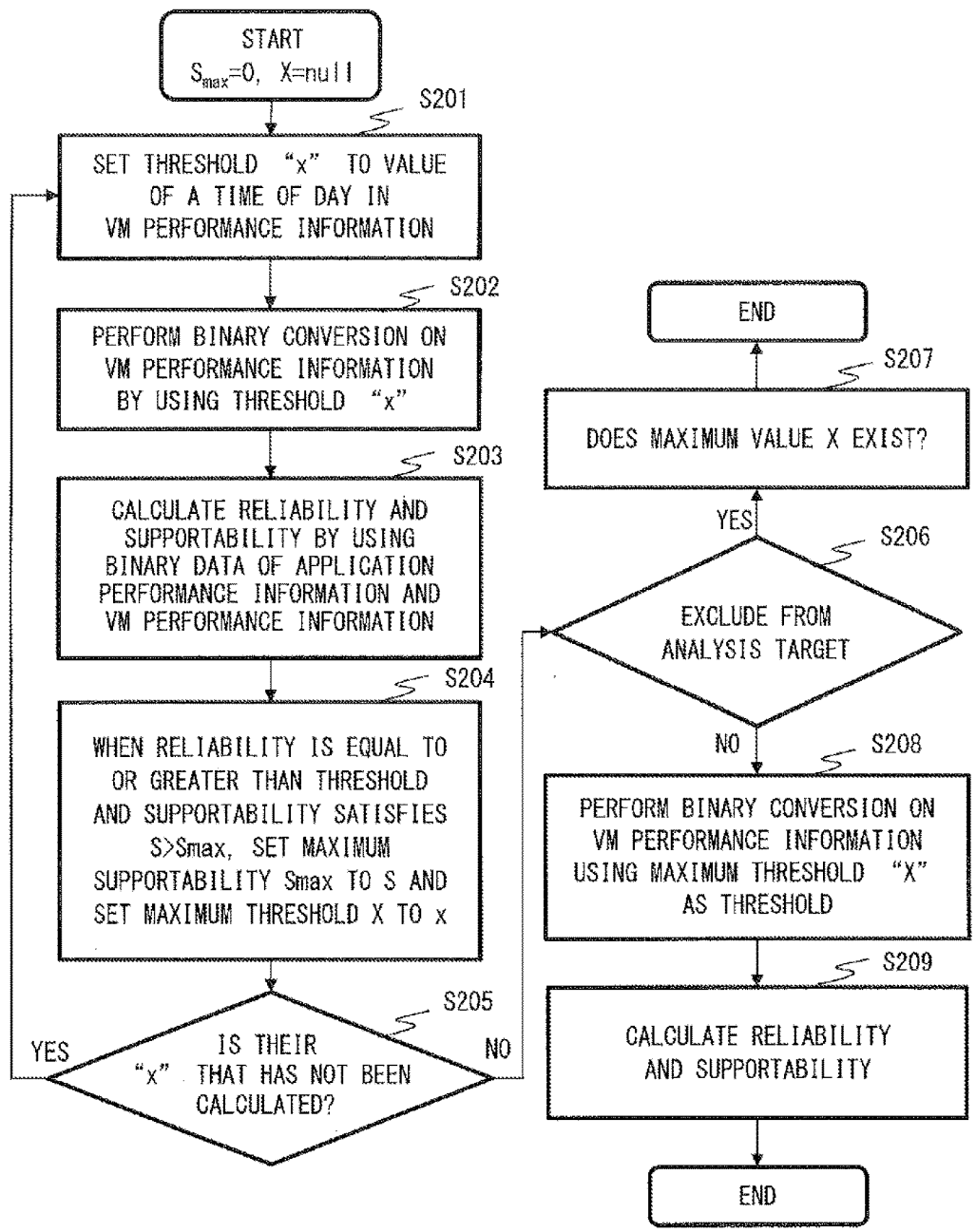
FIG. 20 is a flowchart illustrating an example of a process related to binary conversion.

FIG. 20 is a flowchart illustrating an example of a process related to binary conversion. The flowchart illustrated in FIG. 20 is specifically the process in step S107 illustrated in FIG. 19B. Upon the start of the process in step S107, $S_{max}$, which represents the maximum supportability, is set to 0 as the initial value, and X, which represents maximum threshold, is also set to 0 (null).

The binary conversion unit 3300 selects, as a threshold, data "x", which is data at a time in VM performance information (step S201). The binary conversion unit 3300 converts VM performance information into binary data by using threshold "x" (step S202). The correlation rule calculation unit 3400 calculates a reliability and a supportability (correlation rule) by using application performance information of binary data and VM performance information of binary data.

When the calculated reliability is equal to or greater than a prescribed threshold (equal to or greater than 0.8 for example) and calculated supportability S is greater than $S_{max}$, which represents the current maximum supportability, the correlation rule determination unit 3500 sets calculated supportability S to $S_{max}$, which represents the maximum supportability (step S204). Also, the correlation rule determination unit 3500 sets threshold "x" to threshold "X", which results in the maximum supportability.

The binary conversion unit 3300 determines whether or not there is data at a time of day that has not been used as threshold "x" (step S205). When there is data at a time of day that has not been used as threshold "x" (Yes in step S205), the binary conversion unit 3300 repeats the processes from step S201.

When there is not data at a time of day that has not been used (No in step S205), the correlation rule determination unit 3500 determines whether or not there is threshold "X", which results in the maximum supportability. When there is not threshold "X", which results in the maximum supportability (No in step S206), the type of the VM performance information is excluded from the analysis target. The analysis device 3000 terminates the analysis process on this VM performance information (one type).

When there is threshold "X", which results in the maximum supportability (Yes in step S206), the binary conversion unit 3300 uses threshold "X", which has the maximum supportability of VM performance information, so as to convert each piece of VM performance information into binary data (step S208). The correlation rule calculation unit 3400 uses application performance information of binary data and VM performance information of binary data so as to calculate a reliability and a supportability (correlation rule) (step S209). The analysis device 3000 terminates the process in step S107 illustrated in FIG. 19B.

All examples and conditional language provided herein are intended for the pedagogical purpose of aiding the reader in understanding the invention and the concepts contributed by the inventor to further the art, and are not to be construed as limitations to such specifically recited examples and conditions, nor does the organization of such examples in the specification related to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An analysis device for analyzing performance information of an application and performance information of a virtual machine, the analysis device comprising:
   a memory;
   a processor coupled to the memory and configured to extract a type, which is performance information of a virtual machine that is a cause of a process delay of a type of an application as an analysis target; and
   a display device configured to display the extracted type, the processor calculates a correlation coefficient of performance information of the application and performance information of the virtual machine,
   when the correlation coefficient is equal to or greater than a prescribed correlation determination threshold, the processor:
   converts a value of performance information of the application into binary data based on a first threshold and converts a value, of every hour, of performance information of the virtual machine into binary data as a second threshold;
   calculates a reliability and a supportability based on performance information of an application converted into binary data and performance information converted into binary data for each of the second thresholds; and
   extracts the type based on the reliability and the supportability.

2. The analysis device according to claim 1, wherein the processor extracts performance information of a virtual machine having the reliability equal to or greater than a prescribed value and having the supportability that is equal to or greater than a supportability threshold.

3. The analysis device according to claim 1, wherein the processor excludes, from a conversion target, performance information of the virtual machine having the correlation coefficient that is equal to or less than a third threshold.

4. A computer-readable recording medium having stored therein an analysis program that causes a computer for analyzing performance information of an application and performance information of a virtual machine to execute a process comprising:
   extracting a type, which is performance information of a virtual machine that is a cause of a process delay of a type of an application as an analysis target;
   calculating a correlation coefficient of performance information of the application and performance information of the virtual machine;
   when the correlation coefficient is equal to or greater than a prescribed correlation determination threshold,
   converting a value of performance information of the application into binary data based on first threshold and converting a value, of every hour, of performance information of the virtual machine into binary data as a second threshold;
   calculating a reliability and a supportability based on performance information of an application converted into binary data and performance information converted into binary data for each of the second thresholds;
   extracting the type based on the reliability and the supportability; and
   displaying the extracted type in a display device.

5. The computer-readable recording medium according to claim 4, wherein performance information of a virtual machine having the reliability equal to or greater than a prescribed value and having the supportability that is equal to or greater than a supportability threshold is extracted.

6. The computer-readable recording medium according to claim 4, wherein performance information of the virtual machine having the correlation coefficient that is equal to or less than a third threshold is excluded from a conversion target.

7. An analysis method of analyzing performance information of an application and performance information of a virtual machine, the method, executed by a processor, comprising:
   extracting a type, which is performance information of a virtual machine that is a cause of a process delay of a type of an application as an analysis target;
   calculating a correlation coefficient of performance information of the application and performance information of the virtual machine;
   when the correlation coefficient is equal to or greater than a prescribed correlation determination threshold,
   converting a value of performance information of the application into binary data based on a first threshold and converting a value, of every hour, of performance information of the virtual machine into binary data as a second threshold;
   calculating a reliability and a supportability based on performance information of an application converted into binary data and performance information converted into binary data for each of the second thresholds;
   extracting the type based on the reliability and the supportability; and
   displaying the extracted type in a display device.

8. The analysis method according to claim 7, wherein performance information of a virtual machine having the reliability equal to or greater than a prescribed value and having the supportability that is equal to or greater than a supportability threshold is extracted.

9. The analysis method according to claim 7, wherein performance information of the virtual machine having the correlation coefficient that is equal to or less than a third threshold is excluded from a conversion target by the processor.

* * * * *